United States Patent
Dai et al.

(10) Patent No.: US 12,259,950 B2
(45) Date of Patent: Mar. 25, 2025

(54) MODEL SELECTION FOR PRODUCTION SYSTEM VIA AUTOMATED ONLINE EXPERIMENTS

(71) Applicant: Spotify AB, Stockholm (SE)

(72) Inventors: Zhenwen Dai, London (GB); Praveen Chandar Ravichandran, New York, NY (US); Ghazal Fazelnia, New York, NY (US); Benjamin Carterette, Wilmington, DE (US); Mounia Lalmas-Roelleke, Saffron Walden (GB)

(73) Assignee: Spotify AB, Stockholm (SE)

( * ) Notice: Subject to any disclaimer, the term of this patent is extended or adjusted under 35 U.S.C. 154(b) by 1142 days.

(21) Appl. No.: 17/063,606

(22) Filed: Oct. 5, 2020

(65) Prior Publication Data

US 2022/0108125 A1    Apr. 7, 2022

(51) Int. Cl.
| | | |
|---|---|---|
| *G06N 20/00* | (2019.01) | |
| *G06F 18/20* | (2023.01) | |
| *G06F 18/21* | (2023.01) | |
| *G06F 18/2113* | (2023.01) | |
| *G06N 7/01* | (2023.01) | |

(52) U.S. Cl.
CPC ........ *G06F 18/285* (2023.01); *G06F 18/2113* (2023.01); *G06F 18/2178* (2023.01); *G06N 7/01* (2023.01); *G06N 20/00* (2019.01)

(58) Field of Classification Search
CPC .............. G06F 18/285; G06F 18/2113; G06F 18/2178; G06N 7/01; G06N 20/00; G06N 20/10
See application file for complete search history.

(56) References Cited

U.S. PATENT DOCUMENTS

| | | | |
|---|---|---|---|
| 2012/0191630 A1* | 7/2012 | Breckenridge | ........ G06N 20/00 706/12 |
| 2016/0110657 A1 | 4/2016 | Gibiansky et al. | |
| 2017/0311035 A1* | 10/2017 | Lewis | ................ H04N 21/4826 |
| 2019/0095756 A1 | 3/2019 | Agrawal et al. | |
| 2020/0078685 A1* | 3/2020 | Aghdaie | .................. A63F 13/79 |
| 2022/0067087 A1* | 3/2022 | Reardon | ................ G06F 16/638 |
| 2022/0100772 A1* | 3/2022 | Kadarundalagi Raghura | .............. G06F 21/6218 |

OTHER PUBLICATIONS

Malkomes, Gustavo, Charles Schaff, and Roman Garnett. "Bayesian optimization for automated model selection." Advances in neural information processing systems 29 (2016). (Year: 2016).*

(Continued)

*Primary Examiner* — Michael J Huntley
*Assistant Examiner* — Sehwan Kim
(74) *Attorney, Agent, or Firm* — McDonnell Boehnen Hulbert & Berghoff LLP

(57) ABSTRACT

Disclosed examples include an automated online experimentation mechanism that can perform model selection from a large pool of models with a relatively small number of online experiments. The probability distribution of the metric of interest that contains the model uncertainty is derived from a Bayesian surrogate model trained using historical logs. Disclosed techniques can be applied to identify a superior model by sequentially selecting and deploying a list of models from the candidate set that balance exploration-exploitation.

20 Claims, 17 Drawing Sheets

(56) References Cited

OTHER PUBLICATIONS

Brochu, Eric, Vlad M. Cora, and Nando De Freitas. "A tutorial on Bayesian optimization of expensive cost functions, with application to active user modeling and hierarchical reinforcement learning." arXiv preprint arXiv:1012.2599 (2010). (Year: 2010).*
Zhou, Weilin, and Frederic Precioso. "Adaptive bayesian linear regression for automated machine learning." arXiv preprint arXiv:1904.00577 (2019). (Year: 2019).*
"AutoAI Overview", IBM Cloud Pak for Data (2020). Available online at: https://dataplatform.cloud.ibm.com/docs/content/wsj/analyze-data/autoai-overview.html <accessed Aug. 12, 2020>.
H. Akaike, "A new look at the statistical model identification," IEEE Transactions on Automatic Control, vol. 19, No. 6, pp. 716-723 (1974).
G. Schwarz, "Estimating the dimension of a model," Annals of Statistics, vol. 6, pp. 461-464 (1978).
J. Snoek et al., "Practical bayesian optimization of machine learning algorithms," in Advances in neural information processing systems, pp. 2951-2959 (2012).
A. Klein et al., "Meta-surrogate benchmarking for hyperparameter optimization," in Advances in Neural Information Processing Systems 32, pp. 6270-6280 (2019).
J. R. Lloyd et al., "Automatic construction and natural-language description of nonparametric regression models," in Proceedings of the Twenty-Eighth AAAI Conference on Artificial Intelligence, p. 1242-1250 (2014).
G. Malkomes et al., "Bayesian optimization for automated model selection," in Advances in Neural Information Processing Systems 29, pp. 2900-2908 (2016).
H. Kim and Y. W. Teh, "Scaling up the automatic statistician: Scalable structure discovery using gaussian processes," in Proceedings of the Twenty-First International Conference on Artificial Intelligence and Statistics, pp. 575-584 (2018).
X. Lu et al., "Structured variationally auto-encoded optimization," in Proceedings of the 35th International Conference on Machine Learning, pp. 3267-3275 (2018).
T. Elsken et al., "Neural architecture search: A survey," Journal of Machine Learning Research, vol. 20, No. 55, pp. 1-21 (2019).
H. Chai et al., "Automated model selection with Bayesian quadrature," in Proceedings of the 36th International Conference on Machine Learning, pp. 931-940 (2019).
V. Muthukumar et al, "Best of many worlds: Robust model selection for online supervised learning," in Proceedings of Machine Learning Research, pp. 3177-3186 (2019).
D. Precup et al., "Eligibility traces for off-policy policy evaluation," in ICML, pp. 759-766 (2000).
M. Dudik et al., "Doubly robust policy evaluation and optimization," Statistical Science, vol. 29, pp. 485-511 (2014).
M. Farajtabar et al., "More robust doubly robust off-policy evaluation," in Proceedings of the 35th International Conference on Machine Learning, pp. 1447-1456 (2018).
Y. Liu et al., "Representation balancing mdps for off-policy policy evaluation," in Advances in Neural Information Processing Systems 31, pp. 2644-2653, (2018).
N. Vlassis et al., "On the design of estimators for bandit off-policy evaluation," in Proceedings of the 36th International Conference on Machine Learning (2019).
A. Irpan et al., "Off-policy evaluation via off-policy classification," in Advances in Neural Information Processing Systems 32, pp. 5437-5448 (2019).
M. Ghavamzadeh and Y. Engel, "Bayesian policy gradient algorithms," in Advances in neural information processing systems, pp. 457-464 (2007).
M. Ghavamzadeh et al., "Bayesian policy gradient and actor-critic algorithms," The Journal of Machine Learning Research, vol. 17, No. 1, pp. 2319-2371 (2016).
G. Lee et al., "Bayesian policy optimization for model uncertainty," in International Conference on Learning Representations (2019).
B. Letham and E. Bakshy, "Bayesian optimization for policy search via online-offline experimentation," Journal of Machine Learning Research, vol. 20, No. 145, pp. 1-30 (2019).
D. Russo, "Simple bayesian algorithms for best arm identification," in 29th Annual Conference on Learning Theory, pp. 1417-1418 (2016).
K. Chaloner and I. Verdinelli, "Bayesian experimental design: A review," Statistical Science, pp. 273-304 (1995).
J. M. Hernández-Lobato et al., "Predictive entropy search for efficient global optimization of black-box functions," in Advances in neural information processing systems, pp. 918-926 (2014).
A. Foster et al., "Variational bayesian optimal experimental design," in Advances in Neural Information Processing Systems, pp. 14036-14047 (2019).
J. Vanlier et al., "A bayesian approach to targeted experiment design," Bioinformatics, vol. 28, No. 8, pp. 1136-1142 (2012).
D. Golovin et al., "Near-optimal bayesian active learning with noisy observations," in Advances in Neural Information Processing Systems, pp. 766-774 (2010).
B. Shababo et al., "Bayesian inference and online experimental design for mapping neural microcircuits," in Advances In Neural Information Processing Systems, pp. 1304-1312 (2013).
Sato, Masa-aki, "Online Model Selection Based on the Variational Bayes", Neural Computation 13, 1649-1681 (2001).
Bishop, Christopher M., "Pattern Recognition and Machine Learning", Eds. Jordan et al., Springer, 2006, 758 pages.
Hennig, Philipp et al., "Entropy Search for Information-Efficient Global Optimization", Journal of Machine Learning Research 13 (2012), 1809-1837.
Harper, F. Maxwell et al., "The MovieLens Datasets: History and Context", ACM Transactions on Interactive Intelligent Systems, vol. 5, No. 4, Article 19, Dec. 2015, 19 pages.
Hug, Nicolas, "Surprise: A Python library for recommender systems", Journal of Open Source Software 5(52), 2174, 3 pages.

* cited by examiner

MODEL SELECTION FOR PRODUCTION SYSTEM VIA AUTOMATED ONLINE EXPERIMENTS

BACKGROUND

A challenge that machine learning practitioners face is selecting the best model to deploy in production. As a model is often an intermediate component of a production system. Online controlled experiments, such as AB tests tend to yield reliable estimation of the effectiveness of the whole system, but typically can only compare a few models due to budget constraints.

Model selection is a classical topic in machine learning. C. M. Bishop, Pattern Recognition and Machine Learning (Information Science and Statistics). Berlin, Heidelberg: Springer-Verlag, 2006. The standard paradigm of model selection considers a model in insolation and aims at selecting a model that has the best predictive power for unseen data based on an offline dataset. Common techniques, such as cross-validation, bootstrapping, Akaike information criterion (H. Akaike, "A new look at the statistical model identification," IEEE Transactions on Automatic Control, vol. 19, no. 6, pp. 716-723, 1974), and Bayesian information criterion (G. Schwarz, "Estimating the dimension of a model," Annals of Statistics, vol. 6, pp. 461-464, 03 1978) have been widely used for scoring a model's predictive power based on a given dataset. As scoring all the candidate models does not scale for complex problems, many recent works focus on tackling the problem of searching a large continuous and/or combinatorial space of model configurations, ranging from hyper-parameter optimization (J. Snoek, H. Larochelle, and R. P. Adams, "Practical bayesian optimization of machine learning algorithms," in Advances in neural information processing systems, pp. 2951-2959, 2012; and A. Klein, Z. Dai, F. Hutter, N. Lawrence, and J. Gonzalez, "Meta-surrogate benchmarking for hyperparameter optimization," in Advances in Neural Information Processing Systems 32, pp. 6270-6280, 2019), automatic statistician (J. R. Lloyd, D. Duvenaud, R. Grosse, J. B. Tenenbaum, and Z. Ghahramani, "Automatic construction and natural-language description of nonparametric regression models," in Proceedings of the Twenty-Eighth AAAI Conference on Artificial Intelligence, p. 1242-1250, 2014; G. Malkomes, C. Schaff, and R. Garnett, "Bayesian optimization for automated model selection," in Advances in Neural Information Processing Systems 29, pp. 2900-2908, 2016; H. Kim and Y. W. Teh, "Scaling up the automatic statistician: Scalable structure discovery using gaussian processes," in Proceedings of the Twenty-First International Conference on Artificial Intelligence and Statistics, pp. 575-584, 2018; and X. Lu, J. Gonzalez, Z. Dai, and N. Lawrence, "Structured variationally auto-encoded optimization," in Proceedings of the 35th International Conference on Machine Learning, pp. 3267-3275, 2018.) to neural network architecture search (T. Elsken, J. H. Metzen, and F. Hutter, "Neural architecture search: A survey," Journal of Machine Learning Research, vol. 20, no. 55, pp. 1-21, 2019). A more recent work jointly considers the scoring and searching problem for computational efficiency (H. Chai, J.-F. Ton, M. A. Osborne, and R. Garnett, "Automated model selection with Bayesian quadrature," in Proceedings of the 36th International Conference on Machine Learning, pp. 931-940, 2019). Online model selection is an extension of the standard model selection paradigm (M. Sato, "Online model selection based on the variational bayes," Neural Computation, vol. 13, no. 7, pp. 1649-1681, 2001; and V. Muthukumar, M. Ray, A. Sahai, and P. Bartlett, "Best of many worlds: Robust model selection for online supervised learning," in Proceedings of Machine Learning Research, pp. 3177-3186, 2019.). It still treats a model in isolation but considers the online learning scenario, in which data arrive sequentially and the models are continuously updated. This is different to model selection for production system, which views a model in the context of a bigger system and actively controls the data collection.

In reinforcement learning, a model is considered as a decision mechanism, referred to as a policy, and is evaluated for its associated accumulative rewards. Off-policy evaluation predicts the value of a new policy from an offline dataset logged by another policy (D. Precup, R. S. Sutton, and S. P. Singh, "Eligibility traces for off-policy policy evaluation," in ICML, pp. 759-766, 2000; M. Dudik, D. Erhan, J. Langford, and L. Li, "Doubly robust policy evaluation and optimization," Statistical Science, vol. 29, pp. 485-511, 11 2014; M. Farajtabar, Y. Chow, and M. Ghavamzadeh, "More robust doubly robust off-policy evaluation," in Proceedings of the 35th International Conference on Machine Learning, pp. 1447-1456, 2018; Y. Liu, O. Gottesman, A. Raghu, M. Komorowski, A. A. Faisal, F. Doshi-Velez, and E. Brunskill, "Representation balancing mdps for off-policy policy evaluation," in Advances in Neural Information Processing Systems 31, pp. 2644-2653, 2018; N. Vlassis, A. Bibaut, M. Dimakopoulou, and T. Jebara, "On the design of estimators for bandit off-policy evaluation," in Proceedings of the 36th International Conference on Machine Learning, 2019; and A. Irpan, K. Rao, K. Bousmalis, C. Harris, J. Ibarz, and S. Levine, "Off-policy evaluation via offpolicy classification," in Advances in Neural Information Processing Systems 32, pp. 5437-5448, 2019). The definition of the value of a policy shares a similar format with an accumulative metric, which allows baseline methods based on off-policy evaluation to be developed. Many works in reinforcement learning also exploit the idea of Bayesian modeling and Bayesian optimization, where Gaussian process is used to model the value function and obtain policy gradient via Bayesian quadrature (M. Ghavamzadeh and Y. Engel, "Bayesian policy gradient algorithms," in Advances in neural information processing systems, pp. 457-464, 2007; and M. Ghavamzadeh, Y. Engel, and M. Valko, "Bayesian policy gradient and actor-critic algorithms," The Journal of Machine Learning Research, vol. 17, no. 1, pp. 2319-2371, 2016). One paper proposes to use Bayesian models to represent the belief distribution over latent state space and perform off-policy update via a trust region method (G. Lee, B. Hou, A. Mandalika, J. Lee, and S. S. Srinivasa, "Bayesian policy optimization for model uncertainty," in International Conference on Learning Representations, 2019). Letham and Bakshy use multi-fidelity Bayesian optimization for policy search by correlating online and offline metrics (B. Letham and E. Bakshy, "Bayesian optimization for policy search via online-offline experimentation," Journal of Machine Learning Research, vol. 20, no. 145, pp. 1-30, 2019). Their approach relies on the assumption that there exists an offline metric correlated with the online metric and suffers from the limitation of Bayesian optimization, which requires the search space to be relatively low-dimensional. Russo considers the best-arm selection problem in contextual bandits, of which the used techniques are related to model selection but operate at a lower granularity (D. Russo, "Simple bayesian algorithms for best arm identification," in 29th Annual Conference on Learning Theory, pp. 1417-1418, 2016).

Optimal experimental design is an area of research that focuses on techniques for efficient usage of limited resources in training models and data collections. Bayesian optimal experimental design tackles this problem by constructing a predictive model for possible experimental outcome, and seeks to optimize the expected information gain based on the posterior predictive estimation (K. Chaloner and I. Verdinelli, "Bayesian experimental design: A review," Statistical Science, pp. 273-304, 1995; J. M. Hernandez-Lobato, M. W. Hoffman, and Z. Ghahramani, "Predictive entropy search for efficient global optimization of black-box functions," in Advances in neural information processing systems, pp. 918-926, 2014; A. Foster, M. Jankowiak, E. Bingham, P. Horsfall, Y. W. Teh, T. Rainforth, and N. Goodman, "Variational bayesian optimal experimental design," in Advances in Neural Information Processing Systems, pp. 14036-14047, 2019). Rather than selecting model based on logging data, they take a parallel approach of optimizing data selection process based on the logging information, which has been successfully applied to various settings including bioinformatics (J. Vanlier, C. A. Tiemann, P. A. Hilbers, and N. A. van Riel, "A bayesian approach to targeted experiment design," Bioinformatics, vol. 28, no. 8, pp. 1136-1142, 2012), active learning (D. Golovin, A. Krause, and D. Ray, "Near-optimal bayesian active learning with noisy observations," in Advances in Neural Information Processing Systems, pp. 766-774, 2010), and neuroscience (B. Shababo, B. Paige, A. Pakman, and L. Paninski, "Bayesian inference and online experimental design for mapping neural microcircuits," in Advances in Neural Information Processing Systems, pp. 1304-1312, 2013).

SUMMARY

In an example implementation, there is a method for machine learning model selection from a set of candidate machine learning models. The method includes: generating, based on a set of observations, a surrogate model that describes a feedback distribution for a given context and a given action; scoring the set of candidate machine learning models based at least in part on the surrogate model and an acquisition function; selecting, from the scored set of candidate machine learning models, an initial highest-scoring machine learning model; collecting, using the initial highest-scoring machine learning model, an additional observation in the set of observations; updating the surrogate model based on the additional observation; selecting, based at least in part on the updated surrogate model and the acquisition function, a current highest-scoring machine learning model from the set of candidate machine learning models; and deploying the current highest-scoring machine learning model from the set of candidate machine learning models.

In an example, scoring the set of candidate machine learning models includes evaluating each candidate machine learning model of the set of candidate machine learning models based on a generated set of samples from the feedback distribution of the surrogate model. In another example, the current highest-scoring machine learning model is deployed based on determining that an evaluation budget is satisfied, wherein the evaluation budget is a determination that at least one of: the current highest-scoring model exhibits an estimated performance above a first predetermined threshold; a predetermined amount of time has elapsed; a number of observations in the set of observations is above a second predetermined threshold; or a number of users associated with the set of observations is above a third predetermined threshold.

In another example implementation, the acquisition function is an acquisition function selected from a set of acquisition functions consisting of expected improvement, probability of improvement, entropy search, and upper confidence bound. In an example, the set of observations is generated based on at least one candidate machine learning model from the set of candidate machine learning models. In an example, the at least one candidate machine learning model is randomly selected from the set of candidate machine learning models. In an example, the additional observation comprises: a context associated with a user; an action generated using the initial highest-scoring model based on the context associated with the user; and user feedback associated with the generated action.

In an example, the action is selecting a recommended song and the user feedback associated with the generated action is one of: a user selecting to play the recommended song; a user ignoring the recommended song; or a user listening to at least a part of the recommended song. In an example, there is a method for machine learning model selection to generate song recommendations, comprising: generating, using an initial highest-scoring machine learning model of a set of candidate machine learning models, a first song recommendation based on a context associated with a user; receiving user feedback associated with the generated action; updating a surrogate model based on the action, the context, and the user feedback; selecting, based at least in part on the updated surrogate model, a current highest-scoring machine learning model from the set of candidate machine learning models; and using the current highest-scoring machine learning model from the set of candidate machine learning models to generate a second song recommendation. In an example, selecting the current highest-scoring machine learning model from the set of candidate machine learning models comprises: generating a set of samples from the feedback distribution of the surrogate model; and evaluating each candidate machine learning model of the set of candidate machine learning models based on the set of samples. In an example, the current highest-scoring machine learning model is further selected based at least in part on an acquisition function selected from a set of acquisition functions consisting of expected improvement, probability of improvement, and upper confidence bound. In an example, the user feedback associated with the generated action is one of: a user selecting to play the recommended song; a user ignoring the recommended song; or a user listening to at least a part of the recommended song.

In yet another example implementation, there is a system for machine learning model selection from a set of candidate machine learning models, the system comprising: a surrogate model that describes a feedback distribution for a given context and a given action; and a server communicatively coupled to the surrogate model, the server comprising at least one processing device and a memory coupled to the at least one processing device and storing instructions, that when executed by the at least one processing device, cause the at least one processing device to: score the set of candidate machine learning models based at least in part on the surrogate model and an acquisition function; select, from the scored set of candidate machine learning models, an initial highest-scoring machine learning model; collect, using the initial highest-scoring machine learning model, an additional observation in the set of observations; update the surrogate model based on the additional observation; select, based at least in part on the updated surrogate model and the acquisition function, a current highest-scoring machine learning model from the set of candidate machine learning models; and deploy the current highest-scoring machine learning model from the set of candidate machine learning models.

In an example, scoring the set of candidate machine learning models includes: generating a set of samples from the feedback distribution of the surrogate model; and evaluating each candidate machine learning model of the set of candidate machine learning models based on the set of samples. In an example, the current highest-scoring machine learning model is deployed based on determining that an evaluation budget is satisfied, wherein the evaluation budget is a determination that at least one of: the current highest-scoring model exhibits an estimated performance above a first predetermined threshold; a predetermined amount of time has elapsed; a number of observations in the set of observations is above a second predetermined threshold; or a number of users associated with the set of observations is above a third predetermined threshold. In an example, the acquisition function is an acquisition function selected from a set of acquisition functions consisting of expected improvement, probability of improvement, and upper confidence bound. In an example, the set of observations is generated based on at least one candidate machine learning model from the set of candidate machine learning models. In an example, the at least one candidate machine learning model is randomly selected from the set of candidate machine learning models. In an example, the additional observation includes: a context associated with a user; an action generated using the initial highest-scoring model based on the context associated with the user; and user feedback associated with the generated action. In an example, the action is selecting a recommended song and the user feedback associated with the generated action is one of: a user selecting to play the recommended song; a user ignoring the recommended song; or a user listening to at least a part of the recommended song.

BRIEF DESCRIPTION OF THE DRAWINGS

The same number represents the same element or same type of element in all drawings.

FIG. 8, which is made up of FIGS. 8A-8D, illustrates results of a classification experiment.

FIG. 9, which is made up of FIGS. 9A and 9B, illustrates additional results of the classification experiment, with error bars indicating the confidence interval of the estimated mean by two times of the standard deviation.

FIG. 10, which is made up of FIGS. 10A and 10B, illustrates results regarding the comparison of acquisition functions and compares the performance of different acquisition functions used by automated online experimentation in the classification experiment, with error bars in the figures indicating the confidence interval of the estimated mean by two times of the standard deviation.

FIG. 12, which is made up of FIGS. 12A and 12B, illustrates results of a recommender system experiment.

FIG. 13, which is made up of FIGS. 13A and 13B, illustrates additional results of a recommender system experiment, with the error bars in both FIG. 13A and FIG. 13B indicating the confidence interval of the estimated mean by two times of the standard deviation.

DETAILED DESCRIPTION

Figure 1:
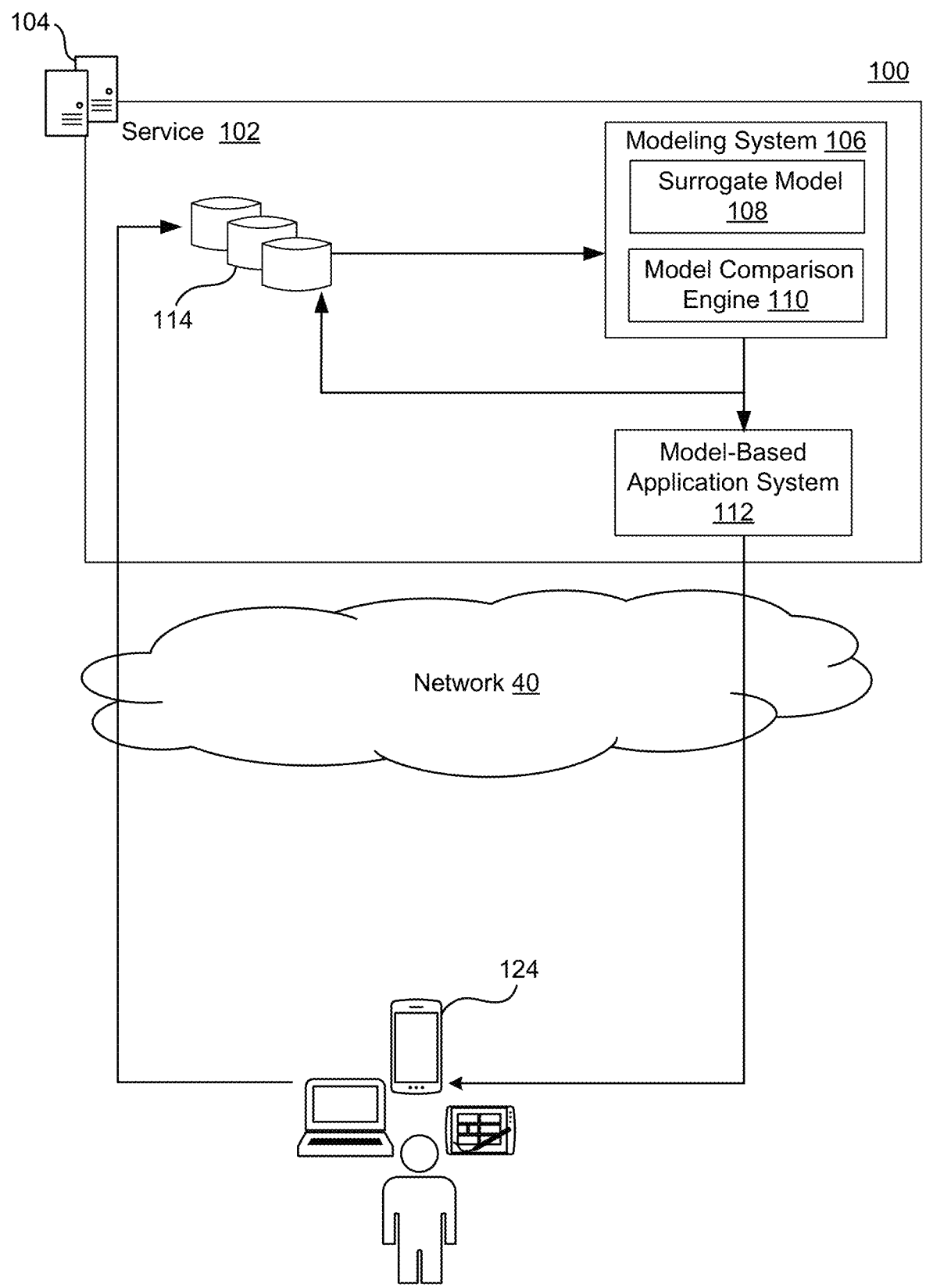
FIG. 1 illustrates an example system having models and a model-based application system.

Machine learning algorithms are commonly used to perform various tasks. When designing a system utilizing machine learning algorithms, it can be difficult for the designer to determine which of a plethora of possible machine learning algorithms to choose. Some will work better than others, but it is difficult to know which one is the best choice. Thus, there may be multiple candidate machine learning models that can be used to generate an action for a given context, and selecting the machine learning model to use in a production system is not a trivial task. For example, A/B testing may be used to perform online evaluation of two models, or off-policy evaluation may be used to perform an offline evaluation of candidate models based on previous observations. However, A/B testing may have a negative impact on an associated user experience and may also be inapplicable in instances with a larger number of candidate models. As another example, previous observations utilized for off-policy evaluation may exhibit selection bias, such that evaluating a candidate model that behaves differently than the model with which previous observations were collected may yield unreliable results.

Technology disclosed herein relates to automated online evaluation of a set of candidate models for machine learning model selection. In examples, previous observations are collected based on a machine learning model. An example previous observation may comprise a context, an action, and resulting feedback. The machine learning model may be one or more randomly selected models from the set of candidate models.

A surrogate model is generated based on the previous observations, where the surrogate model describes a feedback distribution for a given context and a given action. Thus, rather than using actual, point-wise feedback from the collected observations, the surrogate model provides a generalized feedback distribution with which to evaluate a candidate model. Accordingly, each candidate model is evaluated using the surrogate model to identify which candidate model exhibits the highest score according to an acquisition function. The highest-scoring model is then deployed to collect additional observations.

Online evaluation of the candidate models progresses by iteratively refining the surrogate model to fit the set of previous observations (which is updated to contain additional observations from the deployed candidate model). The set of candidate models is then re-scored based on the refined surrogate model, and the new highest-scoring model is deployed. This iterative evaluation continues until an evaluation budget is met. The resulting highest-scoring model is then selected to be deployed in the production system. Some example implementations consider data collection as part of the selection process, which leads to the derivation of the probability distribution of the accumulative metric instead of an estimator of the value of a policy as in off-policy evaluation.

System

FIG. 1 illustrates an example system 100. The system 100 includes a service 102 provided by one or more servers 104. The one or more servers 104 are connected to one or more user devices 124 over a network 40. The network 40 can be an electronic communication network, such as the Internet. The one or more servers 104 include or define a modeling system 106, a model-based application system 112, and one or more models 114.

The service 102 is a service configured to provide recommendations to the one or more user devices 124. In many examples herein, the recommendations are described in the context of media content items. A media content item is an item of media content (e.g., audio, video, or other types of media content) that may be stored in any format suitable for storing media content. Non-limiting examples of media content items include songs, albums, audiobooks, music videos, movies, television episodes, podcasts, other types of audio or video content, and portions or combinations thereof. However, techniques described herein can be applied to other kinds of uses beyond recommendations.

The one or more servers 104 are one or more server computing devices that provide the service 102. For example, the one or more servers 104 can include one or more processors (e.g., central processing units) configured to obtain and execute instructions stored in memory that, when executed by the one or more processors cause the one or more processors to implement the service 102 and perform one or more operations described herein. As illustrated, the one or more servers 104 can implement or store a modeling system 106, a model-based application system 112, and one or more models 114.

The modeling system 106 can be a system configured to generate, maintain, train, store, and use models. As illustrated, the modeling system 106 includes a surrogate model 108 and a model comparison engine 110.

In an example, the surrogate model 108 is a model configured to predict feedback (e.g., feedback from a user) in the form of a distribution of a range of expected feedback. In an example, the surrogate model 108 describes a feedback distribution for a given context and a given action. The surrogate model 108 can be configured as a Bayesian surrogate model configured to balance between exploring an uncertain but potentially good choice and exploiting a known choice.

The model comparison engine 110 is a component configured to compare models 114. For example, the model comparison engine 110 can be configured to compare the models 114 based on scores assigned to the models 114 associated with how well a respective model 114 predicted an output based on an input. In some examples, the model comparison engine 110 scores the models for comparison. In other examples, the model comparison engine 110 obtains the scores from one or more other sources.

The model-based application system 112 is an application system that uses the one or more models 114 to produce processed outputs. The processed outputs can be provided to the one or more user devices 124. In an example, the model-based application system 112 uses the one or more models 114 to determine which of one or more media content items to recommend to a user via the user device 124.

The models 114 can be stored in memory of the one or more servers 104. The models 114 can be configured to take input and produce output. The models 114 can take any of variety of forms. In some examples, the models 114 can be machine learning models. For example, the one or more models 114 can be trained to produce particular output based on particular input.

The user devices 124 can be a computing device of a user. In an example, the user device 124 is a computing device, such as a handheld entertainment device, smartphone, tablet, watch, wearable device, in-dash vehicle head unit, an aftermarket vehicle media playback appliance, a smart assistant device, a smart speaker, a smart home device, a television, a gaming console, a set-top box, a network appliance, a media player, a stereo system, an Internet-of-things device, a virtual reality device, an augmented reality device, or a radio, among other devices or systems.

Methods and Uses

Figure 2:
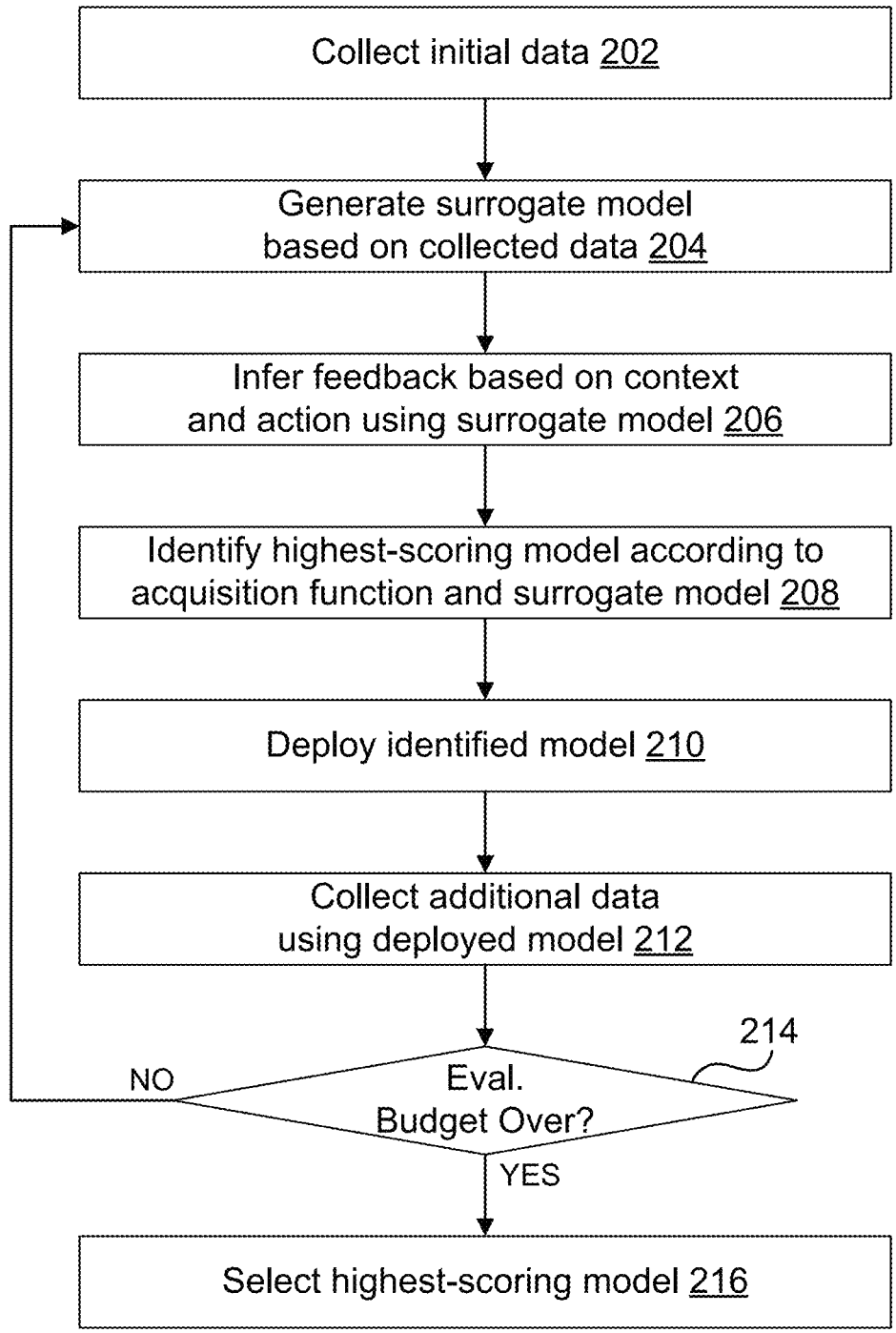
FIG. 2 illustrates an example method that selects a highest-scoring model.

FIG. 2 illustrates a first example method 200 that selects a highest-scoring model. In the illustrated example, the first example method 200 begins with operation 202.

Operation 202 includes to collect initial data. For example, the initial data can include a set of observations. In such an example, the operation 202 can include to generate the set of observations based on a candidate machine learning model of a set of candidate machine learning models. For instance, the candidate machine learning model can be selected using criteria or be selected at least pseudo-randomly. Following operation 202, the method 200 can move to operation 204.

Operation 204 includes to generate a surrogate model based on collected data. For example, the surrogate model can describe a feedback distribution for a given context and a given action. In an example, the given context and the given action are provided as part of the collected data. The context can include, for example, a user profile. The action can include, for example, a media content item recommendation. Example feedback includes whether the user listens to a recommended song or how long the user listens to the recommended song before skipping to a new song, among other examples.

In some examples, the operation 204 is repeated. For example the surrogate model can be generated based on initially collected data and then re-generated or updated based on additional data, such as one or more additional observations in the set of observations. Example additional observations include: a context associated with a user, an action generated using the initial highest-scoring model based on the context associated with the user, and user feedback associated with the generated action, among others. For instance, the generated action can be recommending a song (or other media content item) and the feedback associated with the recommendation can include one or more of a user selecting to play the recommended song, a user ignoring the recommended song, or a user listening to at least a part of the recommended song. Following operation 204, the method 200 can move to operation 206.

Operation 206 includes to infer feedback based on the context and action using the surrogate model. For example, the context and action can be provided as input to the surrogate model. The output of the surrogate model can be used to infer feedback. Following operation 206, the method 200 can move to operation 208.

Operation 208 includes to identify a highest-scoring model according to an acquisition function and surrogate model. An example acquisition function includes one or more of: expected improvement, probability of improvement, and upper confidence bound.

In an example, the operation 208 can include to score a set of candidate machine learning models based at least in part on the surrogate model and an acquisition function. The operation 208 can further include selecting, from the scored set of candidate machine learning models, an initial highest-scoring machine learning model. In an example the scoring includes generating a set of samples from the feedback distribution of the surrogate model and evaluating each candidate machine learning model of the set of candidate machine learning models based on the set of samples. Following operation 208, the method 200 can move to operation 210.

Operation 210 includes to deploy an identified model. For example, the identified model is the initial highest scoring model. Following operation 210, the method 200 can move to operation 212.

Operation 212 includes to collect additional data using the deployed model. For example, the deployed initial highest-scoring machine learning model can be used to obtain an additional observation in the set of observations. Following operation 212, the method 200 can move to operation 214.

Operation 214 includes to determine whether an evaluation budget is exceeded. The evaluation budget can be a predetermined budget allocated by a trainer. Determining that the evaluation budget is exceeded can include determining the existence of one or more of the following conditions: the current highest-scoring model exhibits an estimated performance above a first predetermined threshold; a predetermined amount of time has elapsed; a number of observations in the set of observations is above a second predetermined threshold; or a number of users associated with the set of observations is above a third predetermined threshold. Following operation 214 the method 200 can move to operation 204 responsive to determining that the evaluation budget is not exceeded and to operation 216 responsive to determining that the evaluation budget has been exceeded.

Operation 216 includes to select a highest-scoring model. For example, the operation 216 can include selecting, based at least in part on an updated surrogate model and the acquisition function, a current highest-scoring machine learning model from the set of candidate machine learning models. Then the current highest-scoring machine learning model from the set of candidate machine learning models. In the illustrated example, the selecting is performed responsive to determining that an evaluation budget is satisfied.

Figure 3:
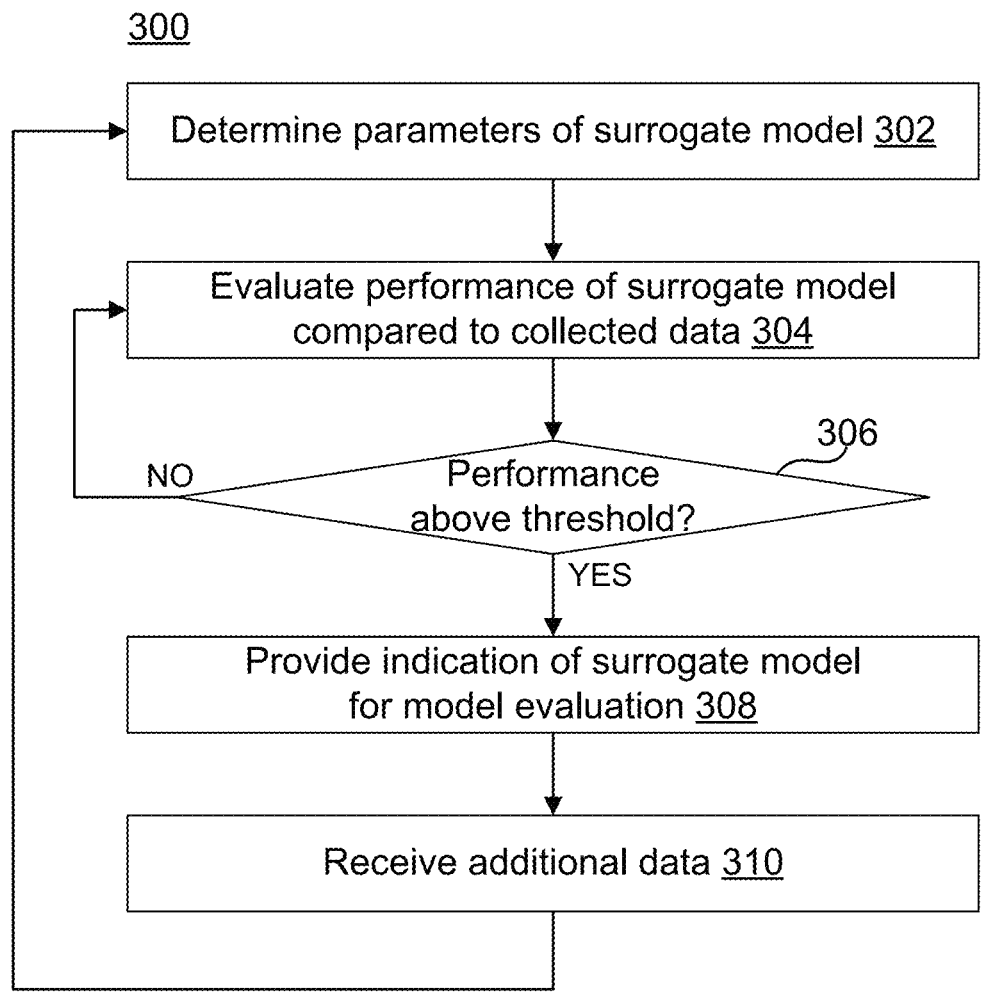
FIG. 3 illustrates an example method that provides an indication of a surrogate model for model evaluation.

FIG. 3 illustrates a second example method 300 that provides an indication of a surrogate model for model evaluation. In an example, the method 300 begins with operation 302.

Operation 302 includes to determine parameters of the surrogate model. For example, the parameters of the surrogate model can include a first portion (e.g., a Gaussian process model or sub-model) that captures components of feedback (e.g., inputs and decisions or actions) and a second portion that covers a noise distribution to absorb stochasticity. For example, the second portion can absorb stochasticity that cannot be explained by the inputs and decisions of noise-free aspects of the first portion. In an example, the determining of parameters of the surrogate model includes training the surrogate model, such as by providing input data, receiving output data from the surrogate model, and determining a loss of the surrogate model and updating one or more parameters of the surrogate model. In some examples, the parameters are one or more weights. In some examples, determining the parameters of the surrogate model includes updating existing parameters based on new data. In some examples, the surrogate model is updated by inferring variational posterior distribution. Following operation 302, the flow of the method 300 can move to operation 304.

Operation 304 includes to evaluate performance of the surrogate model compared to collected data. For example, the actual output of the surrogate model is compared to expected output. Evaluating the performance of the surrogate model can include calculating an error of the surrogate model using any of a variety of techniques. Following operation 304, the method 300 can move to operation 306.

Operation 306 includes to determine whether performance is above a threshold. For example, the performance of the surrogate model is compared to a threshold to determine whether the performance satisfies the threshold. Following operation 306, the method 300 can move to operation 308 if the performance is above the threshold and move to operation 304 if the performance is not above the threshold.

Operation 308 includes to provide an indication of the surrogate model for model evaluation. For example, the surrogate model can be used such that a space of choices corresponds to the set of candidate models and the input to the surrogate model is input to candidate models and the decision from the candidate models. Following operation 308, the method 300 can move to operation 310.

Operation 310 includes to receive additional data. For example, the additional data can be data used to determine parameters of the surrogate model. Following operation 310, the method 300 can return to operation 302.

Figure 4:
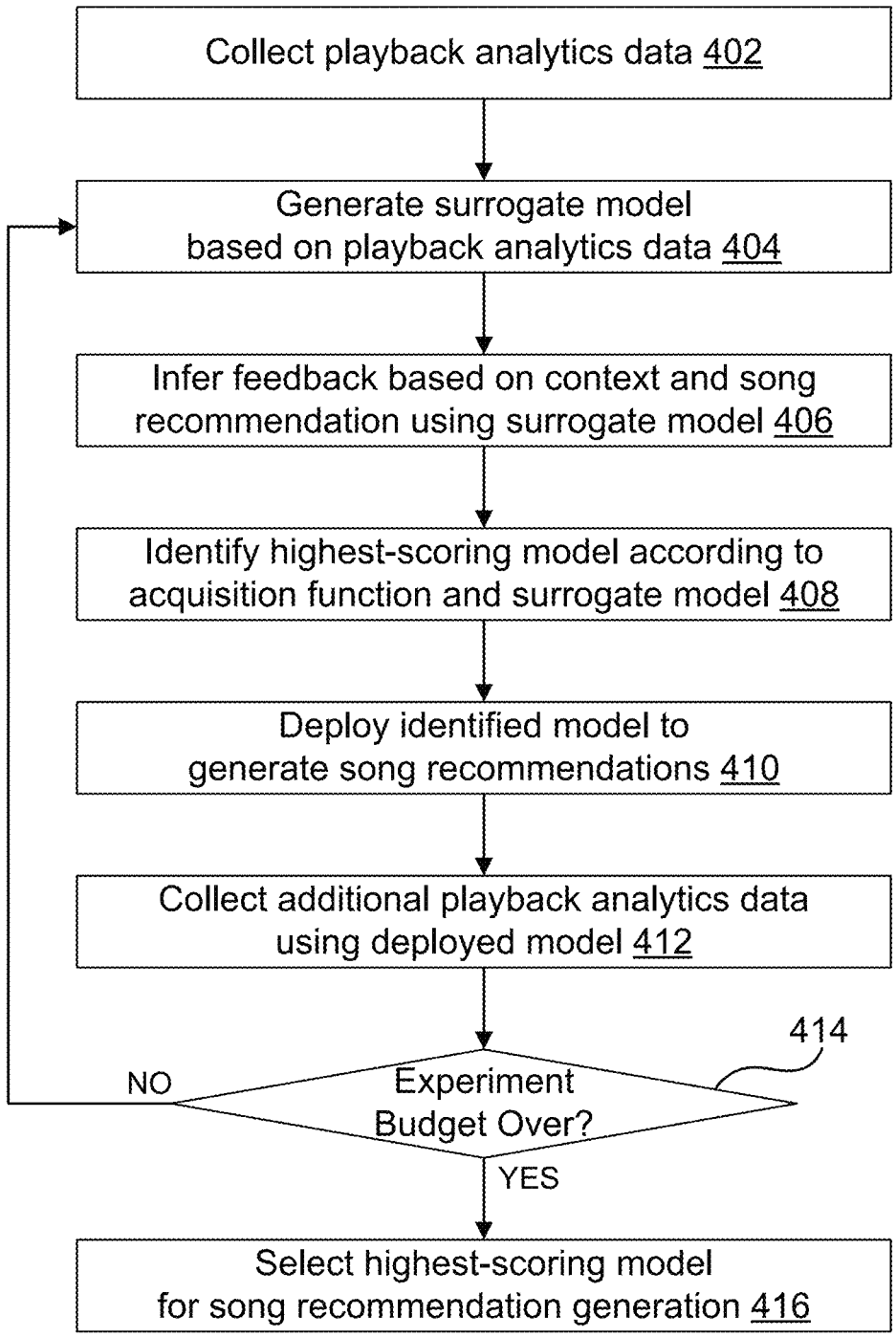
FIG. 4 illustrates an example method that selects a highest-scoring model for song recommendation generation.

FIG. 4 illustrates a third example method 400 that selects a highest-scoring model for song recommendation generation. In the illustrated example, the method 400 begins with operation 402.

Operation 402 includes to collect playback analytics data. In an example, to collect playback analytics data includes to generate a first song recommendation based on a context associated with a user and receive user feedback associated with the generated action. The first song recommendation is generated using an initial highest-scoring machine learning model of a set of candidate machine learning models. The user feedback associated with the generated action can be one or more of: a user selecting to play the recommended song; a user ignoring the recommended song; or a user listening to at least a part of the recommended song. Following operation 402, the flow of the method 400 moves to operation 404.

Operation 404 includes to generate or update a surrogate model based on the playback analytics data. In an example, the playback analytics data includes the action, the context, and the user feedback. Following operation 404, the flow of the method moves to operation 406.

Operation 406 includes to infer feedback based on context and song recommendation using the surrogate model. Following operation 406, the flow of the method 400 moves to operation 408.

Operation 408 includes to identify a highest-scoring model according to an acquisition function and the surrogate model. For example, the operation 408 can include selecting, based at least in part on the updated surrogate model, a current highest-scoring machine learning model from the set of candidate machine learning models. For example, the selecting can include generating a set of samples from the feedback distribution of the surrogate model and evaluating each candidate machine learning model of the set of candidate machine learning models based on the set of samples. In addition or instead, the selecting can be based at least in part on an acquisition function selected from a set of acquisition functions consisting of expected improvement, probability of improvement, and upper confidence bound. Following operation 408, the flow of the method 400 moves to operation 410.

Operation 410 includes to deploy the identified model to generate song recommendations. For example, in-production data can be provided as input to the identified model, and output from the identified model is used to provide one or more song recommendations. Following operation 410, the flow of the method 400 moves to operation 412.

Operation 412 includes to collect additional playback analytics data using the deployed model. For example, the operation 412 can include using the current highest-scoring machine learning model from the set of candidate machine learning models to generate a second song recommendation. Following operation 412, the flow of the method 400 moves to operation 414.

Operation 414 includes to determine whether the experimental budget is exceeded. Responsive to determining that the experimental budget is exceeded, the flow of the method 400 can move to operation 416, and responsive to determining that the experimental budget has not been exceeded, the flow of the method 400 can move to operation 416.

Operation 416 includes to select a highest-scoring model for song recommendation generation.

Figure 5:
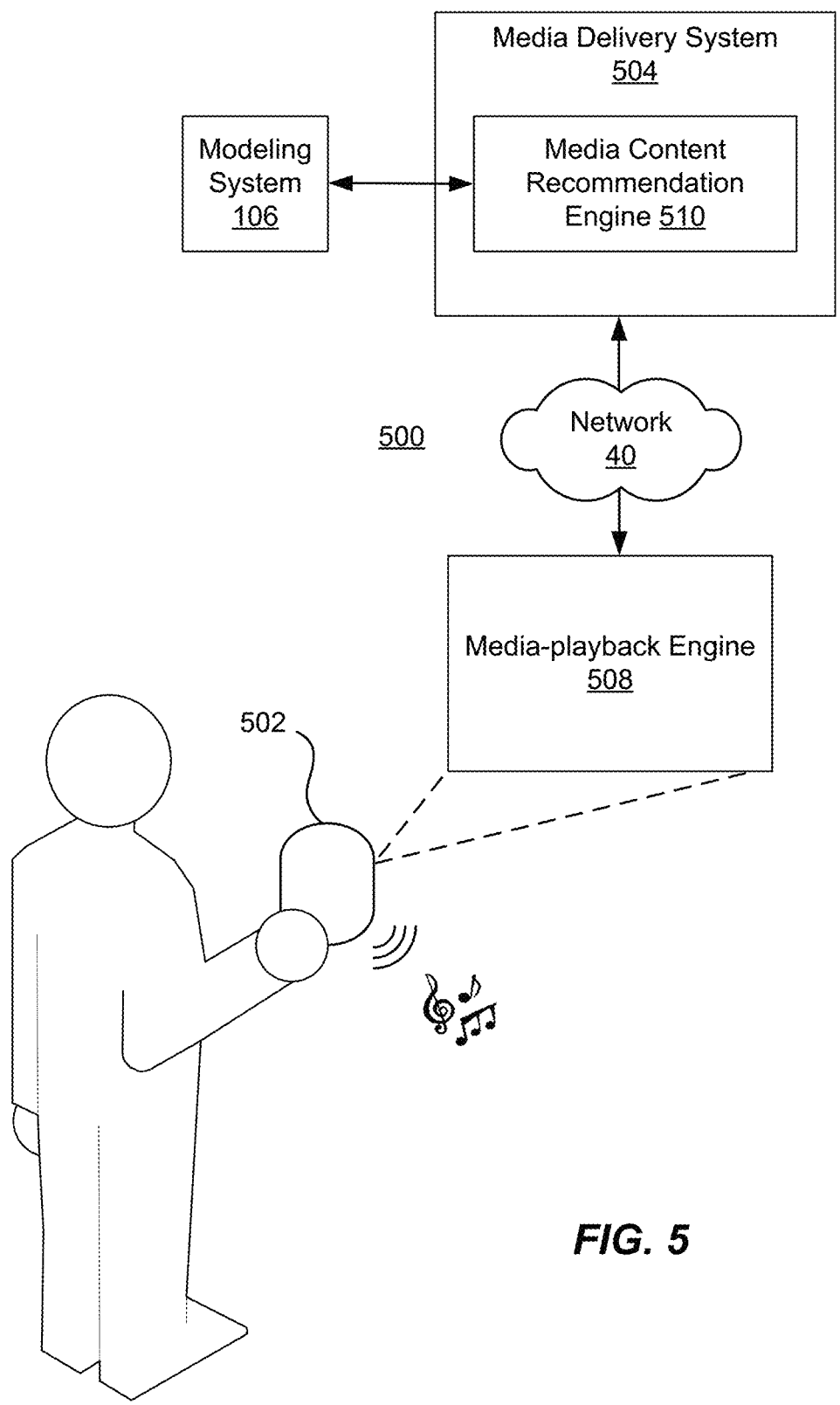
FIG. 5 illustrates an example use of a modeling system in recommending media content items for a media-playback engine.

FIG. 5 illustrates an example system 500 that shows an example use of a modeling system in recommending media contend items for a media-playback engine. In the illustrated system 500, a user device 502 is used by a user. The user device 502 receives input from the user to control a media-playback engine 508. The media-playback engine 508 communicates with a media-delivery system 504 over a network 40 to obtain and play media content items for the user.

The media-playback engine 508 operates on the user device 502. For instance, the media-playback engine 32 can be a media-playback software application. The media-playback engine 32 selects and plays media content and generates interfaces for selecting and playing back media content items. In some examples, a user can interact with the media-playback engine 32 over a user interface. In examples, the media-playback engine 32 obtains one or more media content items from the media delivery server. In examples, the media content items are streamed from the media-delivery system 600. In other examples, the media content items are downloaded to the media-playback device 10 for later playback. For example, the media-playback engine 508 can obtain and present recommendations of media content items. The media-playback engine 508 can then receive input from the user that selects one or more media content items to play.

The recommendations can be obtained from the media-delivery system 504, which includes a media content recommendation engine 510. The media content recommendation engine communicates with the modeling system 106 to obtain a model to be used to determine which one or more media content items to recommend to the user. The media content items can be selected based on, for example, the likelihood that the user will select the recommended media content item. Additional or alternative criteria can include the likelihood that the user will not skip the media content item or will play the entire media content item.

Media Content Item Consumption System

Figure 6A:
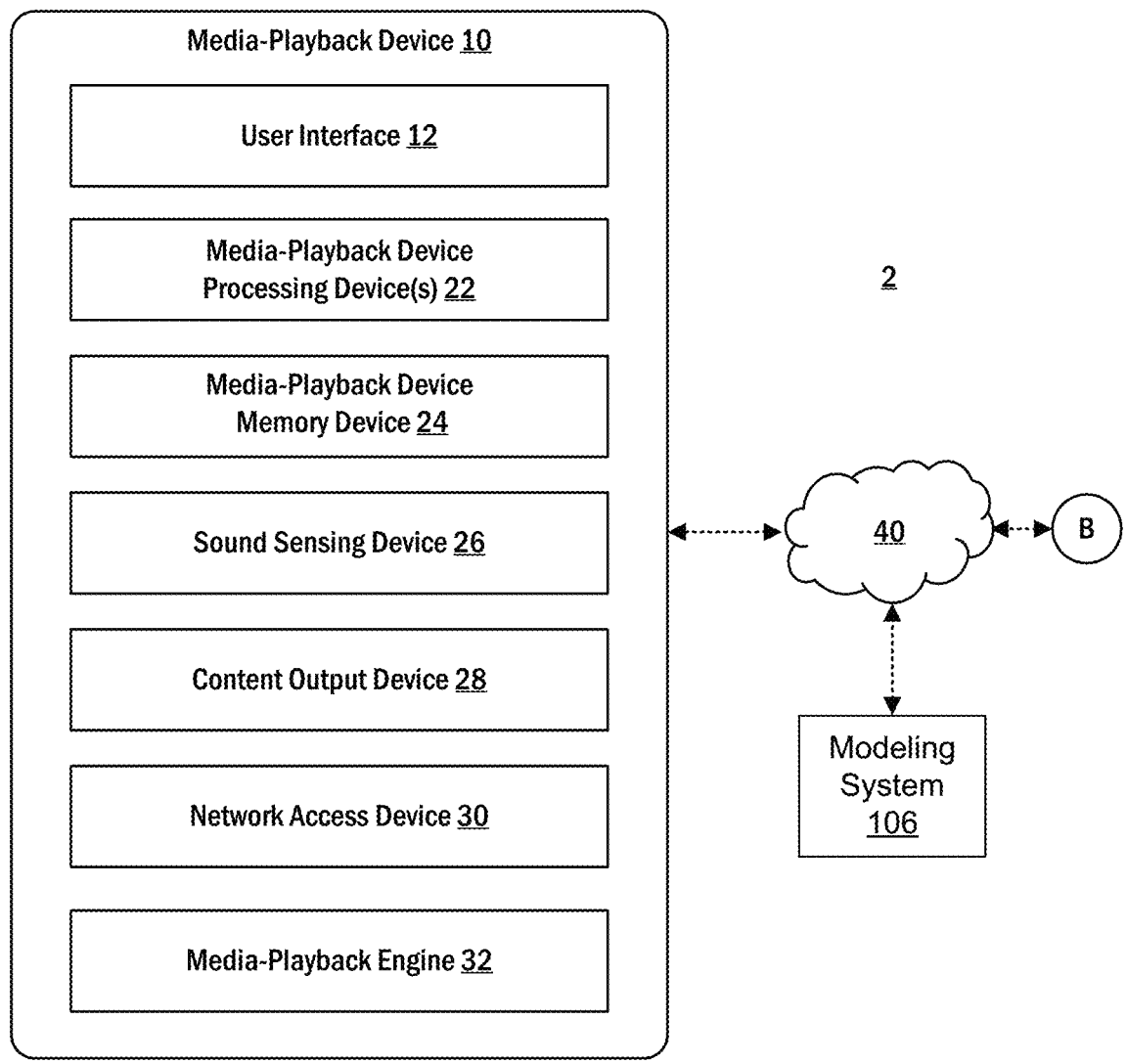
FIG. 6, which is made up of FIGS. 6A and 6B, illustrates an example media-delivery and playback system.
Figure 6B:
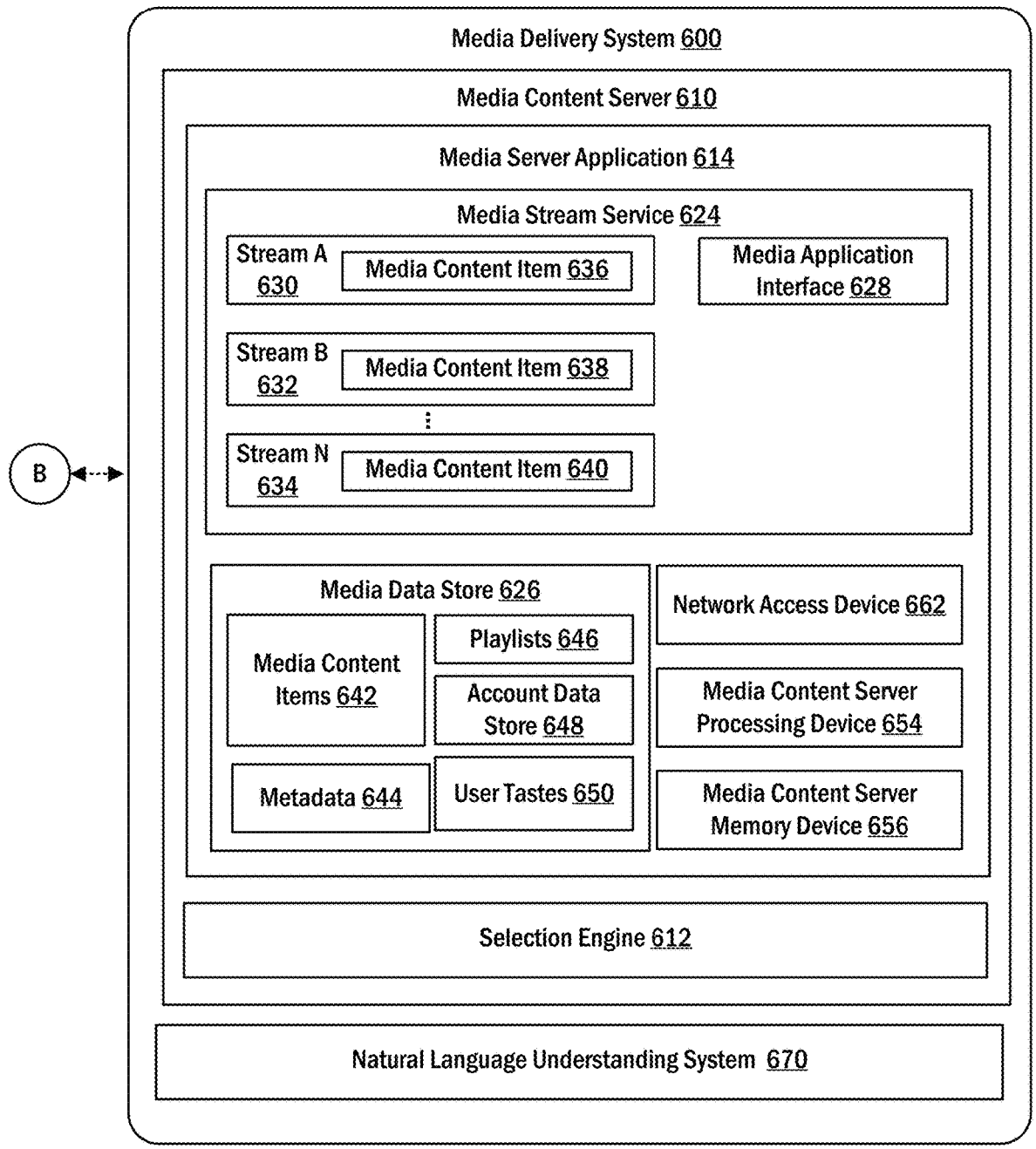

FIG. 6, which is made up of FIG. 6A and FIG. 6B, illustrates an example implementation of the media content item consumption system 2. The system 2 illustrates a media-playback device 10, the modeling system 106, and the media-delivery system 800 connected over the network 40.

The media-playback device 10 is a computing device able to play media content items (e.g., produce visual or audio output) for a user. In some examples, the media content items are provided by the media-delivery system 600 and transmitted to the media-playback device 10 using the network 40. In examples, the media-playback device 10 is a handheld entertainment device, smartphone, tablet, watch, wearable device, or any other type of device capable of playing media content. In yet other examples, the media-playback device 10 is a media playback appliance, such as an in-dash vehicle head unit, an aftermarket vehicle media playback appliance, a smart assistant device, a smart home device, a virtual reality device, an augmented reality device, a television, a gaming console, a set-top box, a network appliance, a BLU-RAY disc player, a DVD player, a media player, a stereo system, smart speaker, an Internet-of-things device, or a radio, among other devices or systems.

The media-playback device 10 plays media content items for a user. The media content items are selectable for playback with user input. The media content items can also selectable for playback or selection by a user without user input, such as by the media-playback device 10 or the media-delivery system 600 (e.g., as part of automatic playback of a next item in a playlist or as part of a station feature). In an example, the media content items are selected for playback by the selection engine 612 of the media-delivery system 600.

In an example, the selection engine 612 is a recommendation engine. In some examples, the selection engine 612 operates to determine one or more media content items from media content items stored in a media data store 626 of the media-delivery system 600 based on various data, such as data regarding the user to whom that the recommendation is provided. The data can include various information, such as factual or explicit information relating to media content items (e.g., media content item titles, album titles, artist names, composer names, other credits, album cover art, publisher name and product number, etc.), a playlist identifier (ID), a user identifier (ID) and a string indicative of descriptive or non-descriptive information. In some examples, the string can represent acoustic attributes (as identified in acoustic metadata, such as tempo, rhythm, beats, downbeats, tatums, patterns, sections, melody, pitch, harmony, timbre, chroma, loudness, vocalness, etc.) and/or cultural attributes (as identified in cultural metadata, such as styles, genres, moods, themes, similar artists and/or songs, rankings, etc.).

In some examples, the media-playback device 10 plays media content items that are provided (e.g., streamed) by a system external to the media-playback device 10, such as the media-delivery system 600, another system, or a peer device. In addition or instead, in some examples, the media-playback device 10 plays media content items stored locally on the media-playback device 10. Further, in at least some examples, the media-playback device 10 plays media content items that are stored locally as well as media content items provided by other systems, such as the media-delivery system 600.

The media-playback device 10 selects and plays media content items and generates interfaces for controlling playback of the media content items. In some examples, the media-playback device 10 receives user input over the user interface 12, such as a touch screen user interface, an utterance-based user interface, tactile user interfaces, virtual user interfaces, other user interfaces, or combinations thereof, and the media-playback device 10 plays a media content item based thereon. The media-playback device 10 can include other input mechanisms including but not limited to a keypad and/or a cursor control device. The keypad receives alphanumeric characters and/or other key information. The cursor control device includes, for example, a handheld controller, a mouse, a rotary input mechanism, a trackball, a stylus, and/or cursor direction keys.

In some examples, the user interface 12 includes a touch-screen-based user interface. A touch screen operates to receive an input from a selector (e.g., a finger, stylus, etc.) controlled by the user. In some examples, the touch screen operates as both a display device and a user input device. In some examples, the user interface 12 detects inputs based on one or both of touches and near touches. In some examples, the touch screen displays a user interface for interacting with the media-playback device 10. Some examples of the media-playback device 10 do not include a touch screen.

While some examples of the media-playback device 10 do not include a display device, where a media-playback device 10 does include a display device, the media-playback device 10 will often include a graphics subsystem and coupled to an output display. The output display uses various technologies, such as TFT (Thin Film Transistor), TFD (Thin Film Diode), OLED (Organic Light-Emitting Diode), AMOLED (active-matrix organic light-emitting diode) display, and/or liquid crystal display (LCD)-type displays. The displays can also be touch screen displays, such as capacitive and resistive-type touch screen displays.

Examples of the user interface 12 include input control devices that control the operation and various functions of the media-playback device 10. Input control devices include any components, circuitry, or logic operative to drive the functionality of the media-playback device 10. For example, input control device(s) include one or more processors acting under the control of an application.

In some examples, the media-playback device 10 includes one or more media-playback device processing devices 22, and a media-playback device memory device 24. In an example, the media-playback device 10 includes a content output device 28. In an example, the media-playback device 10 includes a network access device 30. In an example, the media-playback device 10 includes a sound-sensing device 26. Other examples may include additional, different, or fewer components.

The one or more media-playback device processing devices 22 include one or more processing units, such as central processing units (CPU), digital signal processors, and field-programmable gate arrays, among others.

The media-playback device memory device 24 operates to store data and instructions. In some examples, the media-playback device memory device 24 stores instructions to perform one or more operations described herein. Some examples of the media-playback device memory device 24 also include a media content cache. The media content cache stores media content items, such as media content items that have been previously received from the media-delivery system 600. The media content cache can also store metadata about media content items such as title, artist name, album name, length, genre, mood, or era. The media content cache can also store playback state information about the media content items, such as the number of times the user requested to playback the media content item or the current location of playback. The playback state can further include an identifier of a current media content item (e.g., a uniform resource identifier thereof), a media content item type of the current media content item (e.g., music, podcast, audiobook, or movie), a device on which the media content item was played (e.g., a phone, tablet, laptop, vehicle device, or smart speaker), and a state associated with playback of the media content item (e.g., driving, running, or studying).

The media-playback device memory device 24 typically includes at least some form of computer-readable media. Computer-readable media includes any available media that can be accessed by the media-playback device 10. By way of example, computer-readable media include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory and other memory technology, compact disc read only memory, BLU-RAY discs, DVD discs, other optical storage, magnetic cassettes, magnetic tape, magnetic disk storage or other magnetic storage devices, or any other medium that can be used to store the desired information and that can be accessed by the media-playback device 10. In some examples, computer-readable storage media is non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

In an example, the media-playback device 10 has the one or more media-playback device processing devices 22 coupled to the media-playback device memory device 24 storing media-playback device instructions which when executed cause the one or more media-playback device processing devices 22 to perform one or more operations described herein.

The content output device 28 operates to output media content. In some examples, the content output device 28 provides media output for a user. In some examples, the content output device 28 provides media output to another device, such as wireless speaker. Examples of the content output device 28 include a speaker assembly having one or more speakers, an audio output jack, a BLUETOOTH transmitter, a display panel, and a video output jack. Other examples are possible as well, such as transmitting a signal through the audio output jack or BLUETOOTH transmitter to reproduce an audio signal by a connected or paired device such as headphones, a speaker system, or a vehicle head unit.

The network access device 30 operates to communicate with other computing devices over one or more networks, such as the network 40. Examples of the network access device include one or more wired network interfaces and wireless network interfaces. Examples of wireless network interfaces include infrared, BLUETOOTH wireless technology, WI-FI, 802.11a/b/g/n/ac, and cellular or other radio frequency interfaces.

In some examples, the media-playback device 10 includes a media-playback engine, such as media-playback engine 508.

The network 40 is an electronic communication network that facilitates communication at least between the media-playback device 10 and the media-delivery system 600. An electronic communication network includes a set of computing devices and links between the computing devices. The computing devices in the network use the links to enable communication among the computing devices in the network. The network 40 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various examples, the network 40 includes various types of links. For example, the network 40 includes wired and/or wireless links, including BLUETOOTH, ultra-wideband, 802.11, ZIGBEE, cellular, and other types of wireless links. Furthermore, in various examples, the network 40 is implemented at various scales. For example, the network 40 is implemented as one or more vehicle area networks, local area networks (LANs), metropolitan area networks, subnets, wide area networks (such as the Internet), or can be implemented at another scale. Further, in some examples, the network 40 includes multiple networks, which may be of the same type or of multiple different types.

The media-delivery system 600 includes one or more computing devices and provides media content items to the media-playback device 10 and, in some examples, other media-playback devices as well. In the illustrated example, the media-delivery system 600 includes a media content server 610 and the association server 90. Although FIG. 6B shows a single instance of the media content server 610, some examples include multiple servers. In these examples, each of the multiple servers can be identical or similar and can provide similar functionality (e.g., to provide greater capacity and redundancy, or to provide services from multiple geographic locations). Alternatively, in these examples, some of the multiple servers may perform specialized functions to provide specialized services (e.g., natural language processing or selecting media content items, etc.). Various combinations thereof are possible as well. The media-delivery system 600 includes a natural language understanding system 670, which can be used to, for example, understand and respond to vocal commands.

The media content server 610 transmits stream media to media-playback devices, such as the media-playback device 10. In some examples, the media content server 610 includes a media server application 614, one or more media content server processing devices 654, a media content server memory device 656, and a media content server network access device 662.

In some examples, the media server application 614 streams music or other audio, video, or other forms of media content. The media server application 614 includes a media stream service 624, a media data store 626, and a media application interface 628. The media stream service 624 operates to buffer media content such as media content items 636, 638, and 640, for streaming to one or more streams 630, 632, and 634.

The media application interface 628 can receive requests or other communication from media-playback devices or other systems, to retrieve media content items from the media content server 610. For example, the media application interface 628 receives communication from the media-playback engine 32 of the media-playback device 10.

In some examples, the media data store 626 stores media content items 642, metadata 644, and playlists 646. The media data store 626 may store one or more databases and file systems. As noted above, the media content items 642 may be audio, video, or any other type of media content, which may be stored in any format for storing media content.

The account data store 648 is used to identify users. In an example, the account data store 648 is used to identify users of a media streaming service provided by the media-delivery system 600. In some examples, the media-delivery system 600 authenticates a user via data contained in the account data store 648 and provides access to resources (e.g., media content items 642, playlists 646, etc.) to a device operated by a user. In some examples, different devices log into a single account and access data associated with the account in the media-delivery system 600. User authentication information, such as a username, an email account information, a password, and other credentials, can be used for the user to log into his or her user account. A device can use stored credentials to log a user into the account on a device.

The media data store 626 includes user tastes data 650. The user tastes data 650 includes but is not limited to user preferences regarding media content items, such as media content items that the user likes/dislikes, media content item qualities that the user likes/dislikes, historical information about the user's consumption of media content, libraries of media content items, and playlists of media content items, among other user data.

The metadata 644 operates to provide various information associated with the media content items 642. In some examples, the metadata 644 includes one or more of title, media content type, artist name, album name, length, genre, mood, era, acoustic fingerprints, and other information. The playlists 646 operate to identify one or more of the media content items 642 and in some examples, the playlists 646 identify a group of the media content items 642 in a particular order. In other examples, the playlists 646 merely identify a group of the media content items 642 without specifying a particular order. Some, but not necessarily all, of the media content items 642 included in a particular one of the playlists 646 are associated with a common characteristic such as a common genre, mood, or era. The playlists 646 can include user-created playlists, which may be available to a particular user, a group of users, or to the public.

In some examples, the media server application 614 or a dedicated access management server provides access management services. In examples, the media server application 614 exposes application programming interface endpoints usable by calling devices or functions to use access management services, such as services for logging in to an account, obtaining credentials associated with an account, generating credentials associated with an account, and other services.

Although in FIG. 8 only a single media-playback device 10 and media-delivery system 600 are shown, in accordance with some examples, the media-delivery system 600 supports the simultaneous use of devices, and the media-playback device 10 and other devices can simultaneously access media content from multiple media-delivery systems 600. Additionally, although FIG. 8 illustrates a streaming media-based system for media playback, other examples are possible as well. For example, in some examples, the media-playback device 10 includes a media data store and the media-playback device 10 selects and plays back media content items without accessing the media-delivery system 600. Further in some examples, the media-playback device 10 operates to store previously-streamed media content items in a local media data store (e.g., in a media content cache).

In at least some examples, the media-delivery system 600 streams, progressively downloads, or otherwise communicates music, other audio, video, or other forms of media content items to the media-playback device 10 for later playback. In accordance with an example, the user interface 12 receives a user request to, for example, select media content for playback on the media-playback device 10.

Additional Details

Evaluating the effect of individual changes to machine learning systems such as choice of algorithms and features is useful in the growth in many Internet services and industrial applications. However, practitioners are faced with the decision of choosing one model from several candidates to deploy in production. This can be viewed as a model selection problem. Classical model selection paradigms such as cross-validation consider machine learning models in isolation and focus on selecting the model with the best predictive power on unseen data. This approach can struggle with modern industrial machine learning systems because such a system usually consists of many individual components and a machine learning model is only one of them. The metric of interest often depends on uncontrollable factors such as users' responses. Only optimizing the predictive power of the machine learning model would not lead to a better metric of the overall system. Instead, A/B tests are considered as the gold-standard for evaluating system changes as they provide a more direct measure of the metric. However, only a few variants of the machine learning model can be tested using randomized experiments, such as A/B tests, as they are time-consuming to conduct and have resource constraints (e.g., the number of active users). Further, deploying bad systems can lead to catastrophic consequences.

An alternative approach is to exploit log data collected under the production system to estimate the metric of interest if a different machine learning model is deployed. Typical methods include developing offline measures or simulators that model users' behavior, and replaying the recorded decisions with a probability ratio correction between the new and previous model, which is referred to as off-policy evaluation. A challenge faced by these methods is the selection bias of the log data. As a consequence, these methods work well when the considered model behaves similar to the logging model, but the effectiveness deteriorates quickly when the considered model behaves differently from the logging model.

To address the selection bias, techniques described herein can include incorporation of the data collection process into the model selection approach. A new framework of model selection for production system is provided where the model is selected via deploying a sequence of models online. This allows deploying the model that can provide maximum information of candidate models, iteratively refining the belief about the candidate models, and efficiently identifying the model that leads to the best metric for the overall system. An example targets a specific but widely existing scenario: the metric of interest can be decomposed into an average of immediate feedback (e.g., the click-through rate in recommender systems). A Bayesian surrogate model can efficiently digest the collected data from online experiments and derive the probability distribution of the metric of interest based on the surrogate model. The model to deploy is selected by balancing the exploration-exploitation trade-off. Compared with AB testing, such techniques can perform model selection from a large pool of candidates by using not only the recorded metric but also the log data about individual user interactions. Comparing with off-policy evaluation, such techniques provide more accurate estimation of model performance by avoiding the selection bias through controlling the data collection process. Overall, disclosed techniques can advantageously correctly identify a best model from among candidates even if the model behaves differently from the one in production.

The problem of model selection for production system as follows: given a set of candidate models $M_i \in \mathcal{M}$ and an online budget, the goal is to identify model $M^+$ with maximum utility of the overall system:

$$M^* = \arg\max_{M_i \in \mathcal{M}} v(M_i) \quad \text{Equation (1)}$$

Examples in this section focus on a scenario where a model takes an input representation x, returns a decision a while observing an immediate feedback for each individual decision. The utility associated with a given model $M_i$ is influenced by immediate feedback, which can be an indirect and complex relationship (e.g., the relation between profit margin and user clicks). Techniques can relate to cases where the utility has an additive relation with immediate feedback and refer to it as accumulative metric. The above situations can be common in the industry. For example, in recommender systems, the inputs x are users or context (user representation, time of the request, etc.), the decisions are the choice of recommendation, and the accumulative metric could be a metric such as total consumption, which is the sum of consumption associated with individual recommendations. However, techniques described herein can be applied to other scenarios.

A model can be represented as a probability distribution of the decision conditioned on the input p(a|x), where a deterministic system simply results in a delta distribution. The distribution of the inputs to the model represented as p(x) is typically unknown. The accumulative metric for a given model $M_i$ can be defined as:

$$v(M_i) = \int_{\mathcal{X}} \int_{\mathcal{A}} m p(m|a,x) p(a|x,M_i) p(x) da\ dx, \quad \text{Equation (2):}$$

where the integration is over the space of input $x \in \mathcal{X}$ and the space of decision $a \in \mathcal{A}$. The accumulative metric is defined as an expectation of immediate feedback with respect to the distribution of input and decisions conditioned on individual inputs. The accumulative metric is not tractable, because both the distribution of input p(x) and the distribution of immediate feedback p (m|a, x) are unknown.

With a production system, the information about the accumulative metric can be collected by deploying the model of interest in production and let it react to real traffic and record the corresponding accumulative metric. The collected data from such a deploy consist of a recorded accumulative metric, such as $$\hat{v} = \frac{1}{N} \sum_i m_i,$$

and a set of interactions $\mathcal{D} = \{(m_i, a_i, x_i)\}_{i=1}^N$. Model selection for production system can be defined as a sequential optimal decision problem. A model selection for production system method iteratively chooses a model from the candidate set to deploy online for data collection with the aim of identifying the model with the best accumulative metric in the fewest number of online experiments. Model deployment can be an expensive process, as each deployment takes a long time, and only a small number of models can be deployed in parallel due to the limited number of users and the affordable degradation in service quality. Global optimization methods like Bayesian optimization typically do not work well in this setting, because Bayesian optimization represents the search space in a relatively low dimensional space but embedding the model candidate sets (especially models of different types) into a low-dimensional space is non-trivial. Unlike Bayesian optimization methods that only take into account the accumulative metric from online experiments, techniques disclosed in this section can take advantage of the full log data by training a Bayesian surrogate model. The uncertainty of the surrogate model is then used to balance between exploring an uncertain but potentially good choice and exploiting a known one.

Instead of using the recorded accumulative metric from online experiments, the accumulative metric can be estimated from its definition in equation (2), above. In this formulation, p(a|x, $M_i$) is known and p(x) can be replaced with an empirical distribution, therefore, the distribution of the immediate feedback p(m|a, x) can be captured. The data collected from online experiments includes data points about this distribution. This allows a Bayesian surrogate model for immediate feedback.

A Gaussian process can be used as the surrogate model for the distribution of the immediate feedback. There is often stochasticity in the immediate feedback data including the intrinsic stochasticity in human interactions (e.g., some random reactions from a user) as well as the information that is not available to the production system. To accommodate this stochasticity, the Bayesian surrogate model can be divided into two parts: (i) a Gaussian process model that captures the "noise-free" component of the immediate feedback, denoted as p(f|a, x); (ii) a noise distribution used to absorb all the stochasticity that cannot be explained by x and a, denoted as p(m|f). When the immediate feedback is a continuous value, a Gaussian noise distribution can be used. The resulting surrogate model can be written as:

$$m = f(a,x) + \epsilon, f \sim \mathcal{GP}(0, k(\cdot,\cdot)), \epsilon \sim \mathcal{N}(0, \sigma^2), \quad \text{Equation (3):}$$

where the Gaussian process has zero mean and a covariance function k(·,·). Stationary covariance functions are the most common choices, such as the radius basis function (RBF) and the Matérn covariance functions. Note that the distribution of the immediate feedback p(m|a, x) is independent of the choice of candidate models. This allows a single surrogate model to be trained and used to score the candidate models.

In some use cases, the inputs x and/or the decisions a are categorical values (e.g., in recommender systems, the input may be a user ID and the decision may be an item ID, both of which are categorical values). The standard one-hot encoding is not always a good representation for Gaussian process. Instead, we embed each unique ID as a latent variable in a low dimensional space (e.g., $a_k \in \mathbb{R}^Q$, $a_k \sim \mathbb{R}(0, I)$). This approach is closely related to variational multi-output Gaussian processes. Deep Gaussian processes can be considered if the distribution of immediate feedback is heavily non-stationary.

With a surrogate model for the immediate feedback, the accumulative metric from Equation (2) can be estimated. The integral is generally intractable but can be approximated by methods, such as Monte Carlo sampling. The resulting quantity v(M_i) is deterministic as all the involved probability distributions are integrated out, and the resulting quality can serve as an estimator for the accumulative metric but in some cases may not be used for exploration-exploitation tradeoff. To construct an efficient model selection for production system method, the accumulative metric can be represented as a random variable, of which the uncertainty reflects the current belief of its value according to the surrogate model, which is often referred to as model uncertainty.

To derive the accumulative metric as a random variable that reflects model uncertainty, uncertainty is removed from the noise distribution, which corresponds to aleatoric uncertainty. This is particularly useful for the case of a binary immediate feedback, which is explained in more detail below. Firstly, the expected immediate feedback is derived from the noise distribution (i.e., $\bar{m} = \langle m \rangle_{p(m|f)}$). In the case of a normal noise distribution, the expected immediate feedback is the mean of the noise distribution, $$\bar{m} = \int m \, \mathcal{N}(m; f, \sigma^2) dm = f$$

Then, the predictive expected immediate feedback is derived from an inferred Gaussian process surrogate model by a change of random variable, $p(\bar{m}|A, X, \mathcal{D}) = p(f|_{f=\bar{m}} A, X, \mathcal{D})$, where $p(f|A, X, \mathcal{D})$ is the noise-free predictive distribution from Gaussian process conditioned on the collected data via online experiments.

In an example, there is a list of inputs $X = (x_1, \ldots, x_T)$ and the decision space $\mathcal{A}$ being discrete, denoted as $A = (a_1, \ldots, a_k)$. Given a model $M_i$, the distribution of the model can be represented as a matrix $P \in [0,1]^{K \times T}$, where each entry $p_{ij} = p(a_i | x_j)$. The accumulative metric is defined as the sum of immediate feedback weighted by inputs and decision probabilities. This allows the accumulative metric to be derived as a random variable $\hat{v}|M_i, \mathcal{D}$, $$\hat{v} | M_i, \mathcal{D} = \frac{1}{T} P_:^T \bar{m}, \bar{m} \sim p(\bar{m} | A, X, \mathcal{D}) \quad \text{Equation (4)}$$

where the subscript : denotes the vectorization of a matrix and $\bar{m}$ is the vector of expected immediate feedback corresponding to the combinatorial of X and A denoted as $W = ((a_1, x_1), \ldots, (a_k, x_T), \ldots, (a_k, x_T))$. As the change of random variable in equation (4) is a linear operation, the resulting random variable $\hat{v}$ is jointly Gaussian process distributed with $\bar{m}$. The resulting distribution $p(\hat{v} | M_i \mathcal{D})$ can be derived in closed-form, $$p(\hat{v} | M_i \mathcal{D}) = \mathcal{N}\left(\frac{1}{T} P_:^T K_* K^{-1} m, \frac{1}{T} P_:^T (K_{**} - K_* K^{-1} K_*^T) P_:\right) \quad \text{Equation (5)}$$

where m is the recorded immediate feedback in $\mathcal{D}$, K is a covariance matrix among the observed data $\mathcal{D}$, $K_*$ is the cross-covariance matrix between W and $\mathcal{D}$ and $K_{**}$ is the covariance among W.

The expectation of random variable $\hat{v}$ recovers the accumulative metric estimator in equation (2), i.e., $v(M_i) = \int \hat{v} p(\hat{v} | M_i, \mathcal{D}) d\hat{v}$. As the probability distributions of inputs and decisions are represented in the matrix P and the uncertainty from the noise distribution is removed, the uncertainty in $\hat{v}$ is a result of the model uncertainty of the Gaussian process surrogate model, which is crucial for the exploration-exploitation tradeoff.

For a real world problem, $\mathcal{D}$ often contains many data points, for which the cubic complexity of exact Gaussian process inference is too expensive. For scalability, variational sparse Gaussian process approximation can be used. See, e.g., M. Titsias, "Variational learning of inducing variables in sparse gaussian processes," in Proceedings of the Twelfth International Conference on Artificial Intelligence and Statistics, pp. 567-574, 2009. It augments the original data with a set of pseudo data u at the corresponding locations Z. Such an augmentation does not change the original model distribution $p(f|A, X) = \int p(f|u, A, X, Z) p(u|Z) du$. With an efficient variational lower bound, the computational complexity reduces from $O(N^3)$ to $O(NC^2)$, where C is the number of pseudo data. The inference result of sparse Gaussian process is often represented by the variational posterior of the pseudo data, denoted as $q(u) = \mathcal{N}(m_u, S_u)$. With sparse Gaussian process approximation, the distribution $p(\hat{v} | M_i, \mathcal{D})$ becomes $$p(\hat{v} | M_i, \mathcal{D}) = \mathcal{N}\left(\frac{1}{T} P_:^T K_{*u} K_{uu}^{-1} m_u, \frac{1}{T} P_:^T (K_{**} - K_{*u}(K_{uu}^{-1} - K_{uu}^{-1} S K_{uu}^{-1}) K_{*u}^T) P_:\right) \quad \text{Equation (6)}$$

where $K_{uu}$ is the covariance matrix among the pseudo data and $K_{*u}$ is the cross-covariance matrix between W and the pseudo data.

For a large problem, the variance calculation in equation (6) can also be very expensive as $K_{**}$ is a KT-by KT matrix. For efficient computation, we use a FITC approximation at prediction time: $p_{FITC}(f|u, A, X, Z) = \mathcal{N}(K_{fu} K_{uu}^{-1} u, \Lambda)$, where $\Lambda = \text{diag}(K_{ff} - K_{fu} K_{uu}^{-1} K_{fu}^T)$ and diag(•) makes a matrix into a diagonal matrix by letting off-diagonal entries be zero. Although the condition distribution p(f|u) is independent among the entries of f, the resulting distribution $p(\bar{m}|A, X, \mathcal{D})$ is still correlated due the correlation from the pseudo data. With the FITC approximation, the mean $p(\hat{v}|M_i, \mathcal{D})$ remains to be the same, while the variance becomes $$\frac{1}{T} P_:^T (\Lambda + K_{*u} K_{uu}^{-1} S K_{uu}^{-1} K_{*u}^T) P_:,$$

in which only the diagonal entries of $K_{**}$ needs to be computed.

In industrial use cases, binary immediate feedback is widely used because it is easy to calculate and easy to interpret by humans (e.g., whether a user has responded to a shown item, whether a customer has purchased an item or whether a user has played a music or a movie). To apply our method to binary immediate feedback, we can modify the Gaussian process surrogate model.

Firstly, the noise distribution can be changed to a Bernoulli distribution, $p(m|f) = \sigma(f)^m (1-\sigma(f))^{1-m}$, where $\sigma(\cdot)$ is a link function that squashes the value of f to be in (0,1). The most common link function is the logistic function. This makes the Gaussian process surrogate model become a Gaussian process binary classification model, of which the marginal likelihood is no longer closed-form. For both tractability and scalability, stochastic variational sparse Gaussian process approximation (see, e.g., J. Hensman, N.

Fusi, and N. D. Lawrence, "Gaussian processes for big data," in Proceedings of the Twenty-Ninth Conference on Uncertainty in Artificial Intelligence, p. 282-290, 2013) can be used, of which the intractable 1D integral in the variational lower bound is approximated by Gauss-Hermite quadrature. Then the expected immediate feedback from the Bernoulli distribution, which is the probability of the immediate feedback from the Bernoulli distribution, which is the probability of the immediate feedback being one: $\overline{m} = \Sigma_{m \in \{0,1\}} mp(m|f) = \sigma(f)$. The predictive expected immediate feedback from an inferred Gaussian process surrogate model can be derived by a change of random variable, $$p(\overline{m}|A, X, \mathcal{D}) = p(f|_{f=\sigma^{-1}\overline{m}}|A, X, \mathcal{D}) \left| \frac{d^{-1}(\overline{m})}{d\overline{m}} \right|. \quad \text{Equation (7)}$$

where $\sigma^{-1}(\bullet)$ is the inverse of the link function. Both $\sigma(\bullet)$ and $\sigma^{-1}(\bullet)$ are scalar functions. The equation uses $\sigma^{-1}(\overline{m})$ to denote applying $\sigma^{-1}(\bullet)$ to the individual entries of $\overline{m}$. For binary immediate feedback, the random variable of the accumulative metric $\hat{v}$ defined in equation (4) no longer has a closed form probability density function. A sample can be taken from $p(\hat{v}|M_i, \mathcal{D})$ by first drawing a sample from the "noise-free" Gaussian process surrogate model and then computing the sample of $\hat{v}$ according to equation (4), such as:

$$\hat{v}_i = \frac{1}{T} P_i^T \sigma(f_i), f_i \sim p(f|A, X, \mathcal{D}). \quad \text{Equation (8)}$$

For binary immediate feedback, it can be helpful to derive the random variable $\hat{v}$ from the expected immediate feedback $\overline{m}$ instead of the original immediate feedback m. In an example, $\hat{v}$ will be at maximum if the expected immediate feedback m equals 0.5, no matter how small the model uncertainty is. In such a case, the uncertainty in $\hat{v}$ does not reflect the amount of unknowns in the surrogate model. Instead, deriving $\hat{v}$ from $\overline{m}$ can avoid this problem because the uncertainty from the noise distribution is excluded.

After deriving the probability distribution of the accumulative metric, an acquisition function can be used to guide the choice of the next online experiment. The acquisition function $\alpha(\bullet)$ is used in Bayesian optimization, such as related to expected improvement (EI), probability of improvement (PI) and upper confidence bound (UCB). A major difference to Bayesian optimization is that the space of choices is no longer the same as the input space of the surrogate model. The space of choices are the set of candidate models, while the input to the surrogate model is the input to the machine learning model and the decision from the machine learning model. As a result, the acquisition functions designed by considering an extra hypothetical evaluation such as entropy search (e.g., P. Hennig and C. J. Schuler, "Entropy search for information-efficient global optimization," Journal of Machine Learning Research, vol. 13, no. 57, pp. 809-1837, 2012) might not be appropriate for certain approaches. For binary feedback, the acquisition functions are not closed form. Monte Carlo sampling can be used to compute the acquisition function by drawing samples from the distribution of the accumulative metric.

Figure 7:
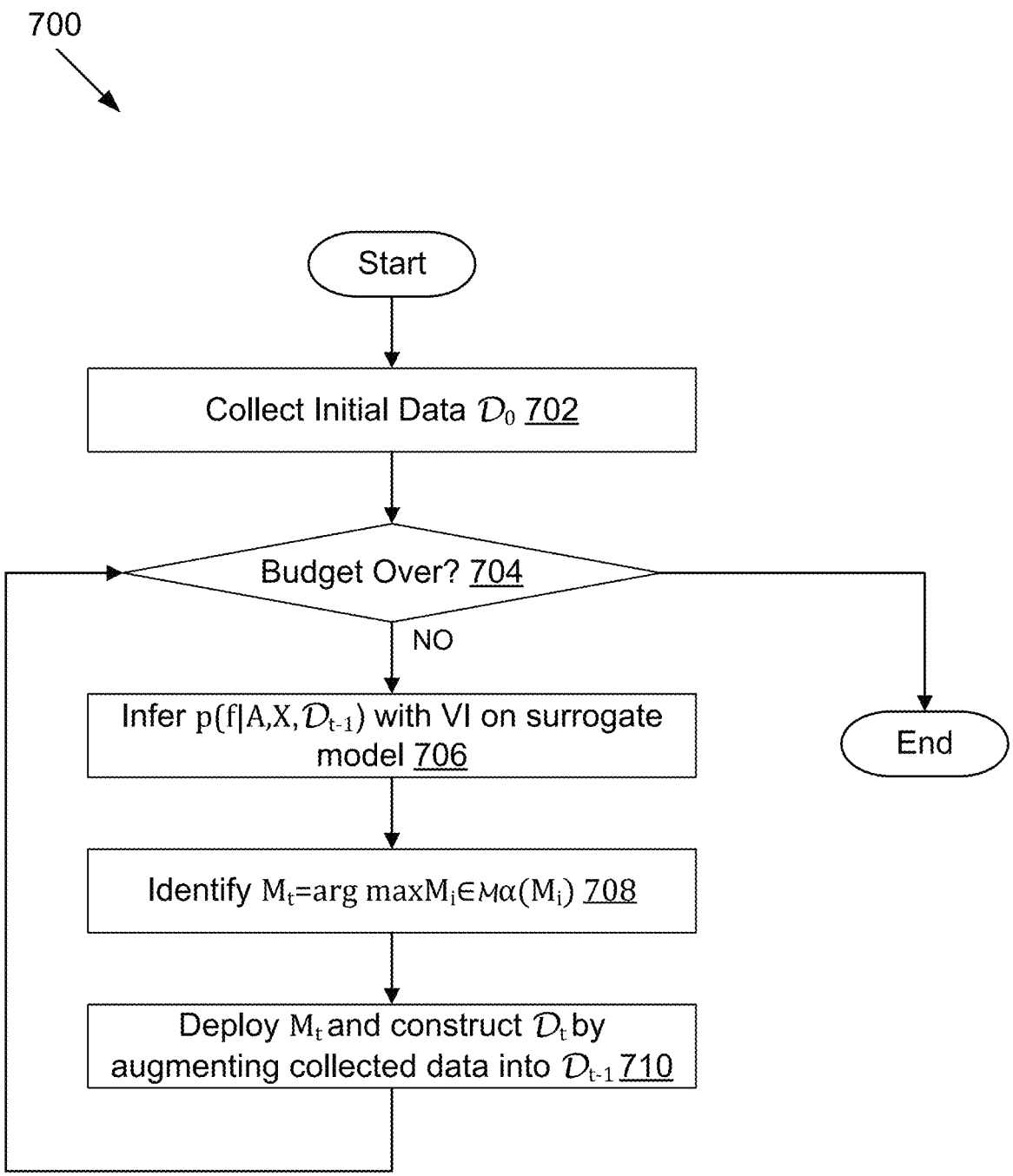
FIG. 7 illustrates an example method of performing automated online experimentation.

An example method 700 of performing automated online experimentation is shown in FIG. 7. The resulting algorithm is referred to as automated online experimentation. The overall method produces the machine learning system with the highest accumulative metric. An initial dataset $\mathcal{D}_0$ can be collected by deploying the model online at operation 702. The model can be randomly chosen or chosen according to some domain knowledge or offline accuracy measure. In some examples, the training data for the candidate models can be used to train the surrogate model as well. At each iteration, a check (operation 704) is made to determine whether the budget is exceeded. If not, the method 700 first updates surrogate model by inferring (operation 706) the variational posterior distribution as mentioned above. Then, the candidate models are scored with the acquisition function, which takes, as inputs, the distribution of the accumulative metric and select the model with the highest score in operation 708. The selected model is deployed online for data collection, and the collected data are augmented into the dataset for updating the surrogate model in operation 710. The method then returns to the check in operation 704. This loop is repeated until the online experiment budget is over. Then, the best model can be estimated from the latest surrogate model.

Experimental Results

Experiments were undertaken to demonstrate the performance of automated online experimentation on automating online experiments for model selection. The inventors constructed two simulators based on real data to perform the evaluation since evaluation on a production system is not reproducible. Automated online experimentation was compared against five baseline methods: (i) directly applying Bayesian optimization on the collected accumulative metrics; (ii) using two off-policy evaluation methods (importance sampling (IS) and doubly robust (DR)) to estimate the accumulative metrics at each iteration and greedily deploy the model with the best estimated metric, denoted as IS-g and DR-g respectively; and finally (iii) using two off-policy evaluation methods to estimate the accumulative metrics with their empirical variance and choose the model to deploy according to an acquisition function (EI), denoted as IS-EI and DR-EI, respectively.

Inspired by off-policy evaluation works, the inventors used a classification dataset to construct the first simulator. The candidate models were multi-class classifiers, and when deployed online, a model will be given a set of inputs but only receives binary feedback about whether the predicted class is correct. The task is to identify the model with the best accumulative metric in the smallest number of deployments, where the accumulative metric is the average accuracy on the hold-on set in this case. The "letter" dataset from UCI repository (D. Dua and C. Graff, "UCI machine learning repository," 2017) was used and randomly 200 data points were taken for training and the rest of the data points were used for "online" experiments. In each online experiment, 200 data points were randomly selected and passed to the "deployed" model and recorded the binary feedback and accumulative metric. The set of candidate models were generated by changing the two tuning parameter of support vector machine, C and $\gamma$. The candidate model set was generated on a 100×100 grid in the space of the two parameters in log scale. To compare with the off-policy evaluation-based baselines, decision a is augmented with an $\in$-greedy step with $\in$=0.05. A Gaussian process binary classifier with Matérn 3/2 kernel was used as the surrogate model, using 2000 inducing points. Expected improvement was used as the acquisition function implemented in GPyOpt (T. G. authors, "GPyOpt: A bayesian optimization framework in python", 2016). Each run included 20 sequential online experiments with the first deployed model randomly picked. Each method repeatedly runs 20 times.

Figure 8A:
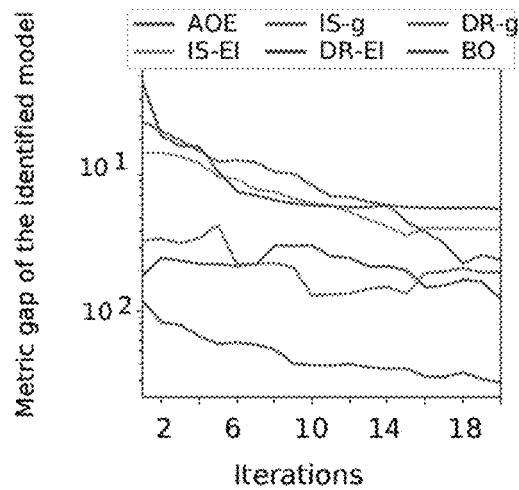
FIG. 8A illustrates a comparison of automated online experimentation and five baseline methods through twenty sequential online experiments (iterations), with the y-axis showing the gap in the accumulative metric between the optimal model and the estimated best model by each method.
Figure 8B:
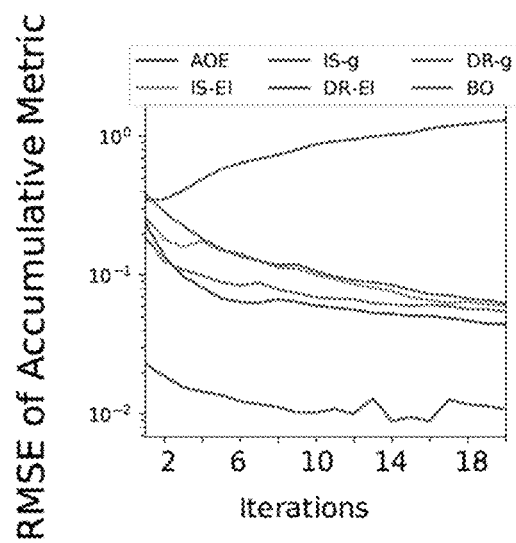
FIG. 8B illustrates RMSE (Rooted Mean Squared Error) of the estimated accumulative metrics for all the candidate models from each method calculated from the same set of experiments as the ones in FIG. 8A.
Figure 8C:
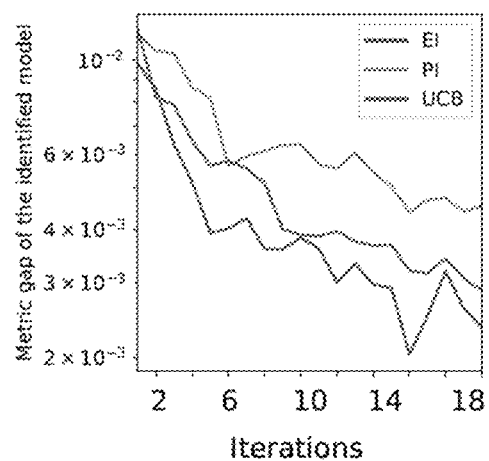
FIG. 8C illustrates a comparison of automated online experimentation using different acquisition functions.
Figure 8D:
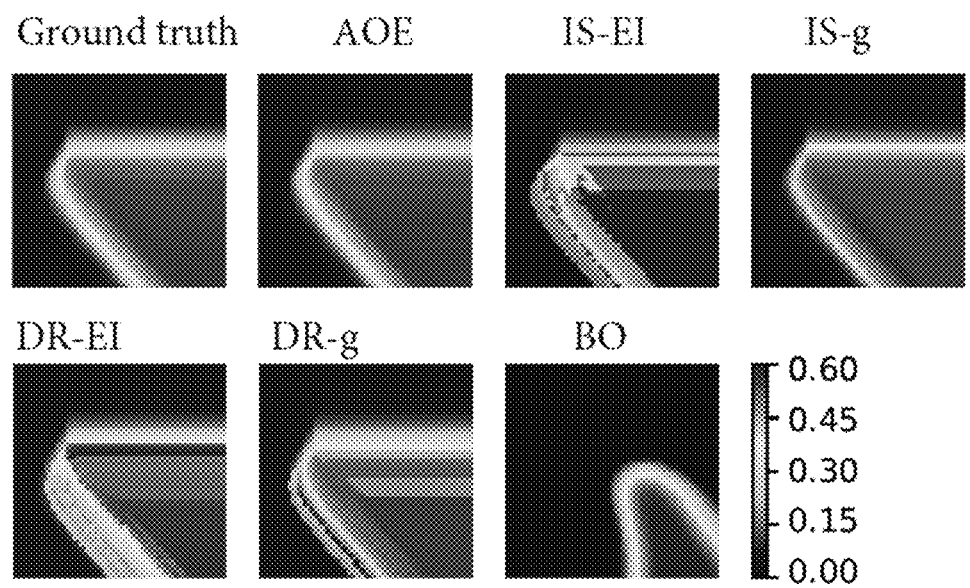
FIG. 8D illustrates heat maps of the estimated accumulative metric of all the candidate models after iteration twenty comparing with the ground truth.

FIG. 8A shows the comparison of all the methods as an average of 20 repeated runs. The performance at each iteration is measured as the gap in the accumulative metric between the optimal model and the estimated best model. The models picked by automated online experimentation at all the iterations have significantly smaller metric gaps and the average metric gaps after Iteration 20 are 0.0029, 0.042, 0.024, 0.013, 0.020, 0.059 for AOE (Automated Online Experimentation), IS-EI, IS-g, DR-EI, DR-g, BO (Bayesian optimization) respectively. Bayesian optimization stops improving after about Iteration 10 because it can only use the recorded accumulative metrics. DR-g and DR-EI are better than IS-g and IS-EI due to their lower variance estimator. FIG. 8B shows the rooted mean square error between the estimated accumulative metrics for all the candidate models from each method, which is averaged across 20 runs. The average rooted mean square error after Iteration 20 are 0.011, 0.061, 0.063, 0.044, 0.054, 1.31 for AOE, IS-EI, IS-g, DR-EI, DR-g, Bayesian optimization respectively. The rooted mean square error of Bayesian optimization does not decrease due to the wrong generation from a few data points, which is worse than a flat prediction in the beginning. FIG. 8C compares the different choices of acquisition functions (EI, PI, UCB) for automated online experimentation, all of which performs similarly with EI being slightly better. FIG. 8D shows a heat map visualization of the estimated accumulative metrics of all the candidate models after Iteration 20 from one of the 20 runs comparing with the ground truth. The x- and y-axis of the heat maps correspond to the two parameters C and $\gamma$ in log scale. Automated online experimentation has the best visual resemblance to the ground truth among others, which is consistent with the rooted mean square error result. Additional details continue below.

As model selection for production system is a new framework for model selection, five baseline methods were constructed by extending the related method into our scenario and compare with automated online experimentation. The five baseline methods are BO (Bayesian optimization), IS-g, DR-g, IS-EI, and DR-EI.

Regarding Bayesian optimization, for each online experiment, there was an unbiased estimate of the accumulative metric under the deployed model as mentioned above. Bayesian optimization was directly applied to the model selection problem by taking the set of candidate models as the input space and the estimate of the accumulative metric from online experiments as the output and treating model selection for production system as an optimization problem. The default setting of Bayesian optimization in GPyOpt was used, where the surrogate model is a Gaussian process regression model with a Gaussian noise distribution and a Mátern 5/2 kernel. Expected Improvement (EI) is used as the acquisition function. For the classification experiment, as the candidate models are naturally generated from a 2D space of the SVM parameters C and $\gamma$, the values of these two parameters were used to identify individual candidate models and use this 2D space as the search space for Bayesian optimization. However, for the recommender system experiment, there are no natural representations for the candidate models. Each candidate model is treated as a categorical value, which leads to its bad performance.

Regarding IS-g and DR-g, off-policy evaluation methods can provide an estimate of the accumulative metric. Two popular off-policy evaluation methods (importance sampling (IS) and doubly robust (DR)) were used to estimate the accumulative metric after each online experiment and greedily choose the candidate model with the highest estimated accumulative metric for the next online experiment. The resulting two methods are denoted as IS-g and DR-g, respectively.

Regarding IS-EI and DR-EI, performance suffered from lack of exploration mechanism. To offer a stronger baseline, not only were IS and DR used to estimate the accumulative metric, but also to calculate the empirical variance of the resulting estimate. Then, the candidate models were scored according to an acquisition function (expected improvement is used in the experiments) and select the next model to deploy with the highest score. The resulting methods are denoted as IS-EI and DR-EI respectively.

As there is limited information to be gained by repeatedly deploying the same model online, models that have been deployed were excluded when choosing the next model to deploy for all the methods including automated online experimentation.

An online experiment scenario was constructed using a classification dataset. The "online" deployment scenario was simulated as follows: a multi-class classifier is given a set of inputs; for each input, the classifier returns a prediction of the label and only a binary immediate feedback about whether the predicted class is correct is available. The performance of a classifier is measured by the average accuracy on the hold-out set, which corresponds to the accumulative metric. As only one model can be deployed at a time and in each deployment a small subset of the hold-out data are used, the task is to select the best-performing model in the smallest number of deployments.

For the experiment, the letter dataset from UCI repository was used (D. Dua and C. Graff, "UCI machine learning repository," 2017). There are, in total, 20,000 data points in the dataset. 200 data points were randomly sampled for training and the rest were used for "online" experiments. In each online experiment, we randomly select 200 data points from the hold-out set and pass them to the "deployed" model and record the binary feedback and accumulative metric.

Support vector machine was used as the multi-class classifier and generate the set of candidate models by varying the two tuning parameters of support vector machine for training, C and $\gamma$. To demonstrate that automated online experimentation can select a good model from a large set of candidates, 10,000 candidate models were generated by choosing C and $\gamma$ from a 100×100 grid in the space of these two parameters in log scale. The value of C was chosen to be between $2^{-5}$ and $2^{15}$ and $\gamma$ between $2^{-15}$ and $2^3$ based on results from prior work. In order to compare with the off-policy evaluation-based baselines, all the predictions from an SVM are augmented with a $\in$-greedy step (the predicted label is sampled according to a categorical distribution) in which the class predicted by the SVM has $1-\in$ probability and the rest classes evenly share the probability $\in$. The experiment set $\in=0.05$.

Gaussian process binary classifier with a Matérn 3/2 kernel was used as the surrogate model. 2000 inducing points were used and EI was used as the acquisition function. When training the surrogate model, the Adam optimization algorithm was used as the gradient optimizer for variational inference, which runs for 600 epochs with the mini-batch size being 100 and the learning rate being 0.001 with stratified sampling. Logistic regression was used as the baseline model for DR-based baselines.

Each model selection experiment includes of 20 sequential online experiments and the model deployed in the first experiments is randomly picked according to a uniform distribution for all the methods. Twenty experiments were run for each model. In each repeated run, the set of candidate models was the same but the first deployed model and the data points sampled for each online experiment could be different due to random sampling.

Figure 9A:
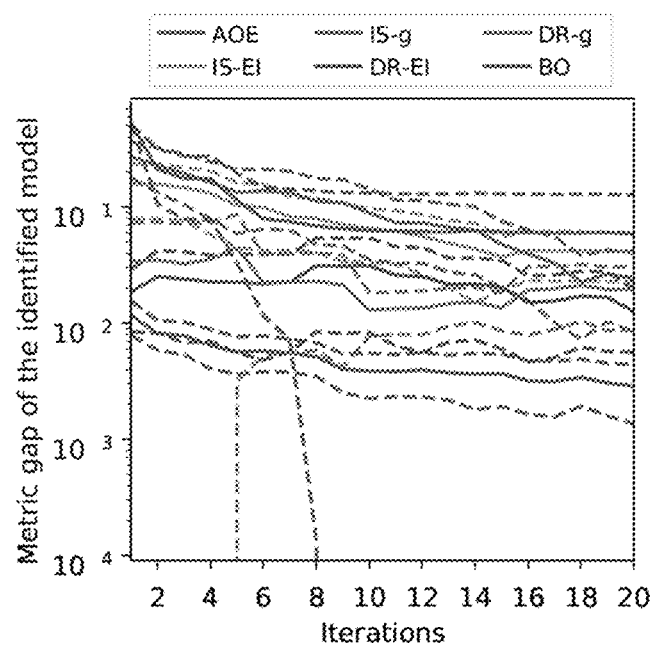
FIG. 9A illustrates a comparison of automated online experimentation and five baseline methods through the twenty sequential online experiments (iterations), with the y-axis showing the gap in the accumulative metric between the optimal model and the estimated best model by each method.
Figure 9B:
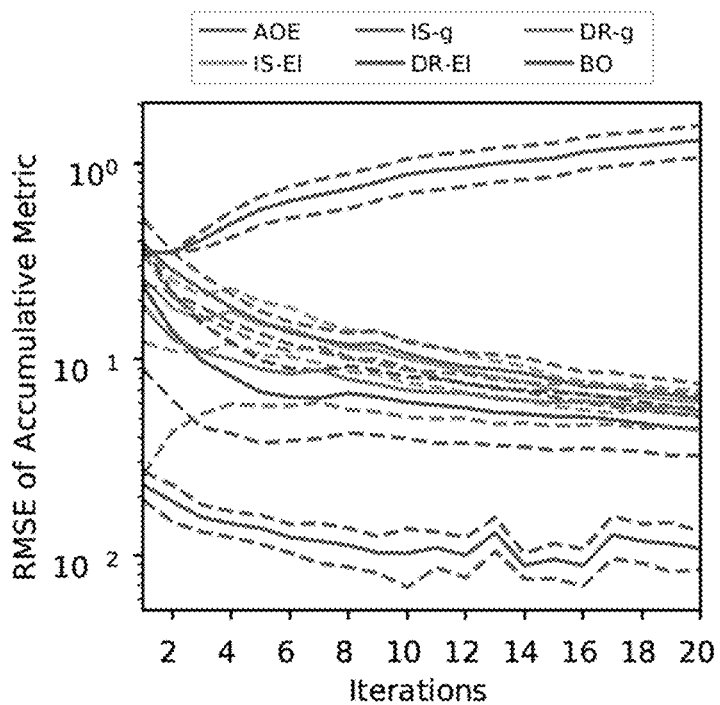
FIG. 9B illustrates the rooted mean square error of the estimated accumulative metrics for the candidate models from each method.

FIG. 9A shows the comparison of all the methods with error bars in terms of the gap in the accumulative metric between the optimal model and the estimated best model. FIG. 9B shows the average rooted mean square error of the estimated accumulative metrics after each iteration with error bars. The error bars indicate the confidence interval of the estimated mean by two times of the standard deviation. The average metric gaps and average rooted mean square error of all the methods after iteration 20 are shown in Table 1, below, with the values in the parentheses indicating the standard deviation of the metric gap and rooted mean square error across the 20 repeated runs.

TABLE 1

|       | Metric Gap      | Rooted mean square error |
|-------|-----------------|--------------------------|
| AOE   | 0.0029 (0.0033) | 0.011 (0.0053)           |
| IS-EI | 0.042 (0.042)   | 0.061 (0.019)            |
| IS-g  | 0.024 (0.036)   | 0.063 (0.027)            |
| DR-EI | 0.013 (0.016)   | 0.044 (0.027)            |
| DR-g  | 0.020 (0.024)   | 0.054 (0.026)            |
| BO    | 0.059 (0.15)    | 1.31 (0.54)              |

Figure 10A:
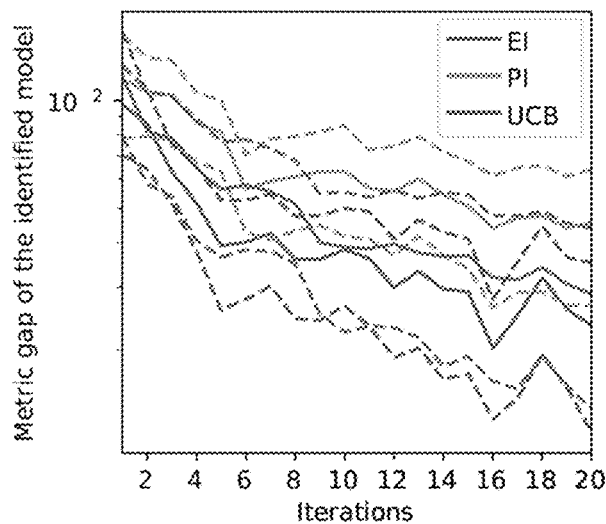
FIG. 10A illustrates a comparison of different acquisition functions in terms of the gap in the accumulative metric between the optimal model and the estimated best model.
Figure 10B:
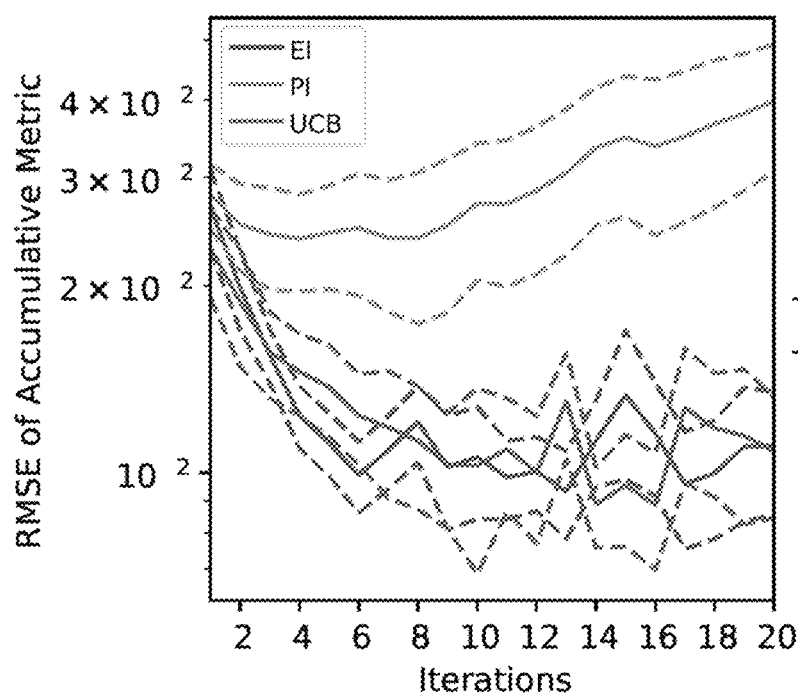
FIG. 10B illustrates a comparison of different acquisition function in terms of rooted mean square error of the estimated accumulative metrics.

Apart from the comparison between automated online experimentation and the baseline methods, the performance of automated online experimentation when using different acquisition functions is also compared. FIG. 10A shows the comparison of different acquisition functions with error bars in terms of the gap in the accumulative metric between the optimal model and the estimated best model. FIG. 10B shows the average rooted mean square error of the estimated accumulative metrics after each iteration with error bars with different acquisition functions. The error bars indicate the confidence interval of the estimated mean by two times of the standard deviation.

Figure 11A:
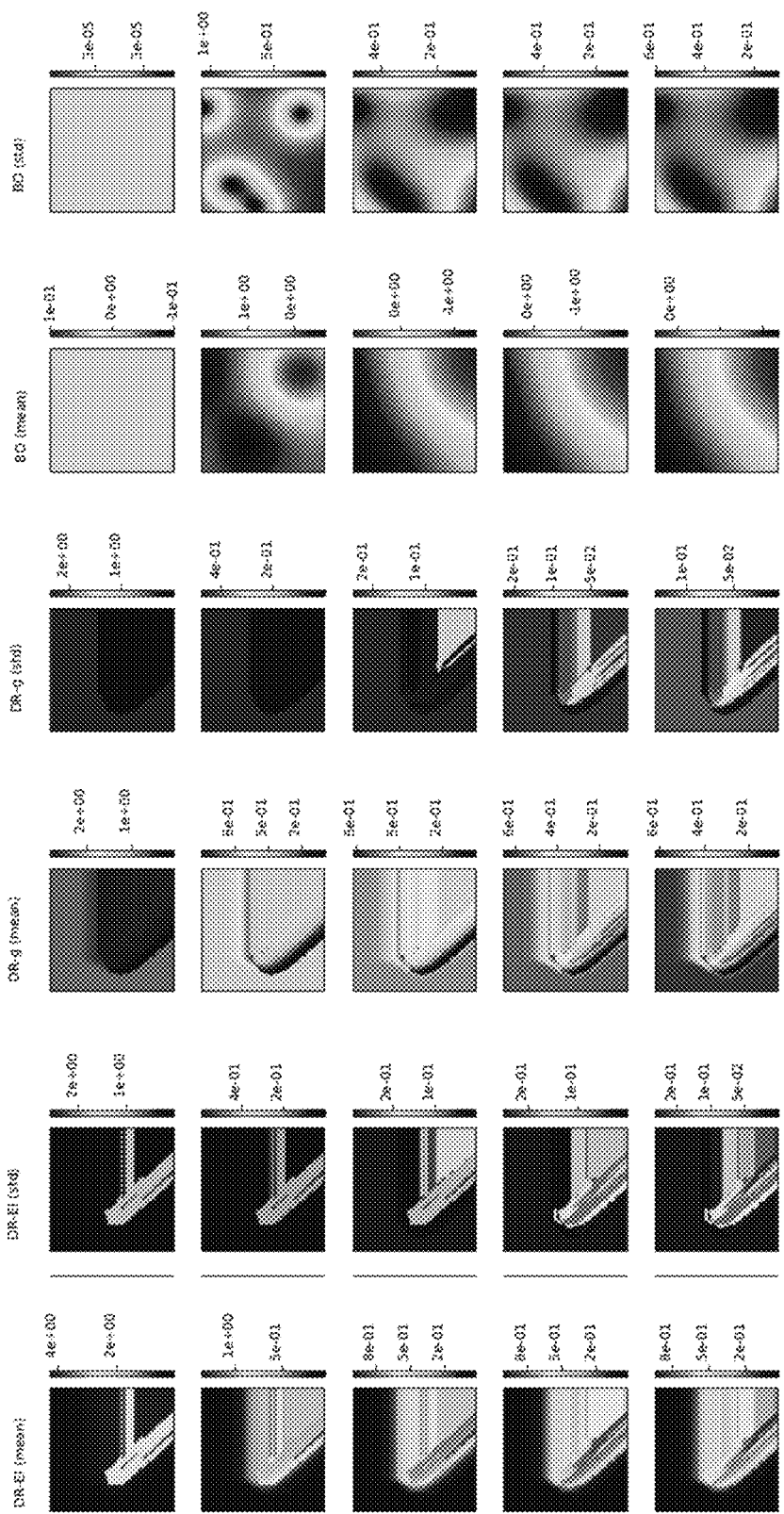
FIG. 11, which is made up of FIGS. 11A and 11B, illustrates a heat map visualization of the estimated accumulative metrics of all the candidate models after Iteration one, five, ten, fifteen, and twenty, with the results coming from one of the twenty repeated runs. The x- and y-axis of the heat maps correspond to the two parameters C and $\gamma$ in log scale. Each column corresponds to a method, with "(mean)" indicating the visualization of the mean of the estimation and "(std)" indicates the visualization of the standard deviation estimated by each method.
Figure 11B:
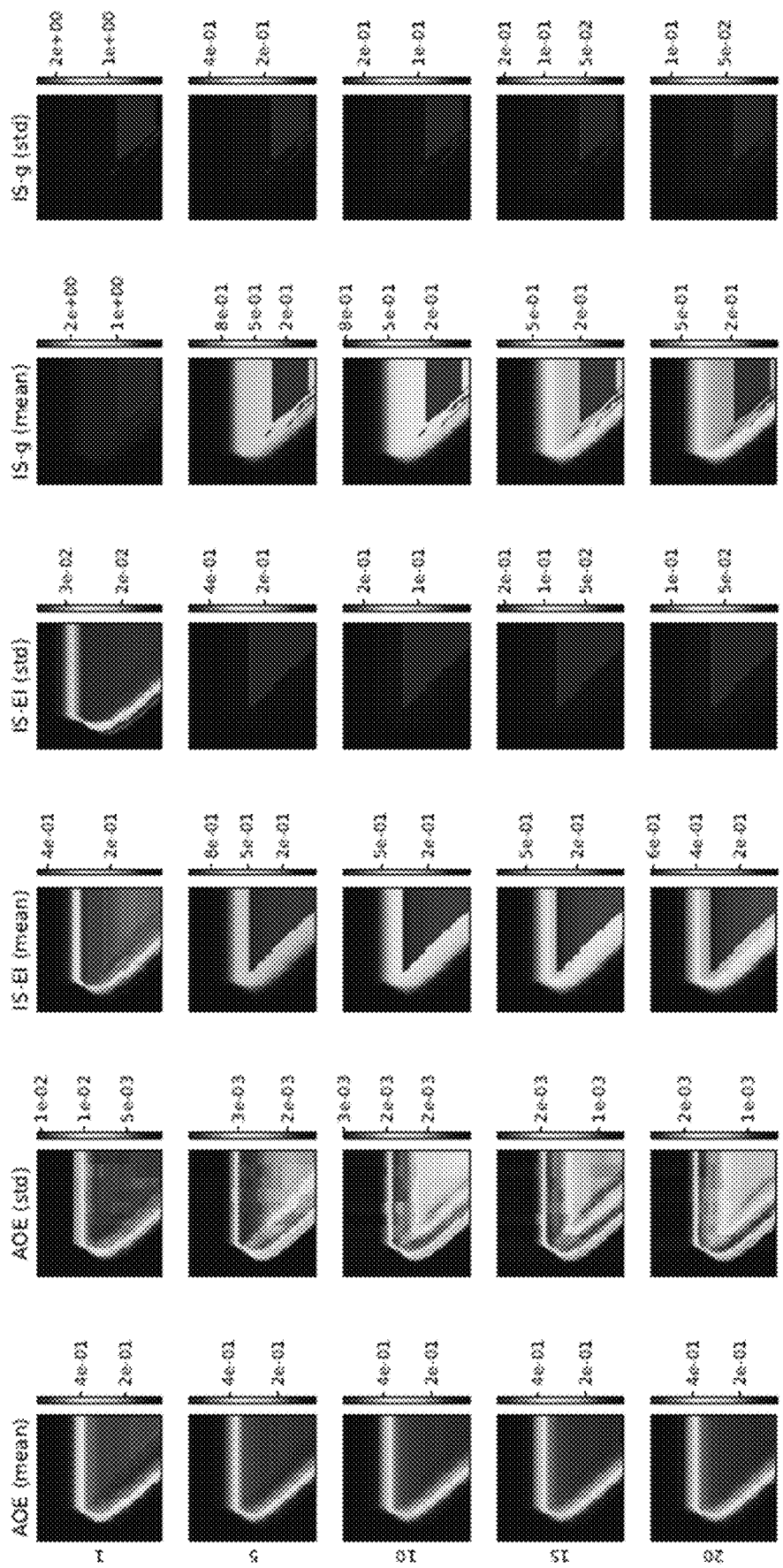

FIG. 11 illustrates the behaviors of automated online experimentation and the baseline methods during the model selection process, the mean and standard deviation of the estimated accumulative metrics were visualized after Iteration 1, 5, 10, 15, and 20 from individual methods. The visualization uses one of the 20 runs. To provide more information, FIG. 8D and FIG. 11 use different runs.

Experiments were also performed that consider model selection for recommender system, which aims to select the best recommender based on its online performance. In this experiment, a recommender system takes a user ID as input and returns an item ID for recommendation. For each recommendation, it receives binary feedback indicating whether the user has responded to the recommended item. The performance of a recommender system is measured by the average response rate, which is the accumulative metric. The MOVIELENS 100 k data was used to construct the simulator for online experiments (See, e.g., F. M. Harper and J. A. Konstan, "The movielens datasets: History and context," ACM Trans. Interact. Intell. Syst., vol. 5, no. 4, 2015). Binary feedback is simulated according to the response probability that is computed by filling all the missing entries in the rating data with zero and mapping a 0-5 rating evenly into a probability between [0:05; 0:95]. Twenty percent of the data was used for training and ten models were trained using the Surprise package (N. Hug, "Surprise, a Python library for recommender systems", 2017). In an online experiment, given a user ID, a trained model returns a predicted response probability and the recommendation is generated by taking the top five items and uniformly choosing one from them. The recommendation is augmented with $\in$-greedy, where $\in=0.05$. Each run includes of five sequential online experiments. In each online experiment, every user is recommended five times.

Figure 12A:
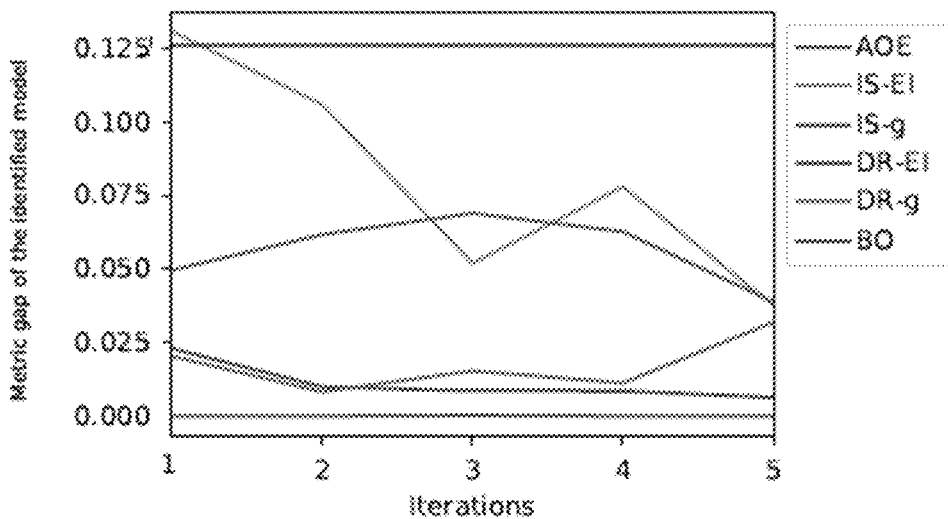
FIG. 12A illustrates a comparison of automated online experimentation and five baseline methods through the five sequential online experiments, with the y-axis showing the gap in the accumulative metric between the optimal model and the estimated best model by each method.
Figure 12B:
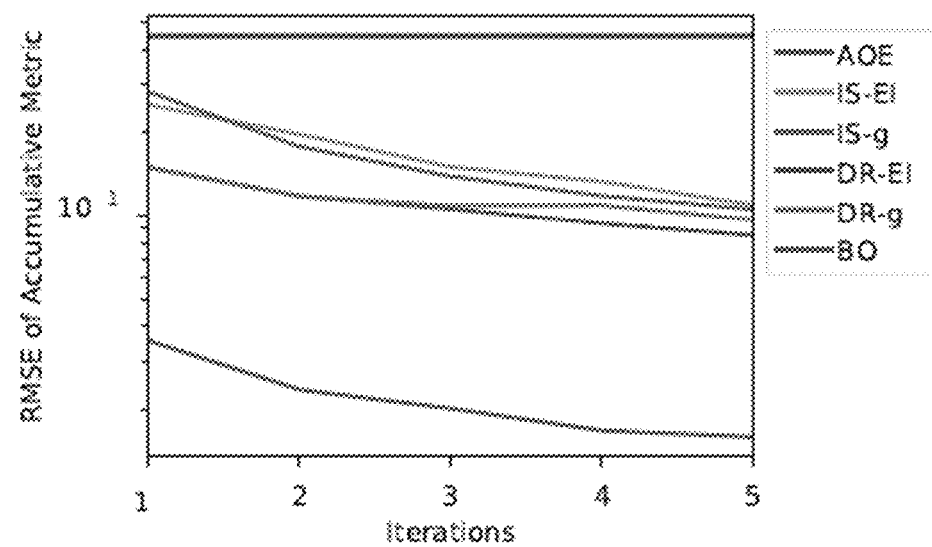
FIG. 12B illustrates the rooted mean square error of the estimated accumulative metrics of all the candidate models by each method.

FIG. 12A shows the comparison with the average of 20 repeated runs. As shown in FIG. 12B, automated online experimentation identifies the best model from the first iteration and Bayesian optimization fails to reduce the metric gap because the search space of candidate models is categorical. The average metric gaps after Iteration 5 are 0., 0.038, 0.039, 0.0063, 0.032, 0.13 for AOE, IS-EI, IS-g, DR-EI, DR-g, Bayesian optimization respectively. FIG. 12A shows the rooted mean square error of the estimated accumulative metrics. The rooted mean square error from automated online experimentation continuously decreases, while correctly identifying the best model. The average rooted mean square error after Iteration 5 are 0.016, 0.11, 0.11, 0.085, 0.097, 0.44 for AOE, IS-EI, IS-g, DR-EI, DR-g, Bayesian optimization, respectively.

Automated online experimentation is demonstrated on the problem of model selection for recommender system, which aims to select the best recommender based on its online performance. In this experiment, a recommender system was considered that takes a user ID as input and returns an item ID for recommendation. For each recommendation, binary feedback is received indicating whether the user has responded to the recommended item. The performance of such a recommender system is measured by the average response rate, which responds to the accumulative metric. A simulator was constructed by using the MOVIELENS 100 k data (F. M. Harper and J. A. Konstan, "The movielens datasets: History and context," ACM Trans. Interact. Intell. Syst., vol. 5, no. 4, 2015). Given a user ID and an item ID, the binary feedback is simulated by drawing a sample from a Bernoulli distribution, in which the probably of being one is specified by the response probability corresponding to the user ID and item ID pair. The MOVIELENS 100 k data provide the ratings corresponding to a list of user and item pairs. Items were filtered that have average rating below a threshold of 0.2. The ratings range between one and five. A full table of the response probability for all the user and item combinations was generated by first filling all the missing entries in the rating data with zero and mapping the resulting 0-5 rating evenly to a probably between [0:05; 0:95]: 0.05 for 0, 0.23 for 1, 0.41 for 2, 0.59 for 3, 0.77 for 4 and 0.95 for 5.

All the user and item features were discarded and randomly 20% of the entries in the response probability table were taken for training the candidate models. Ten models were trained using the Surprise package with their default setting (N. Hug, "Surprise, a Python library for recommender systems." http://surpriselib.com, 2017). The full list of the names of the models are SVD, BaselineOnly, Co-Clustering, KNNBaseline, KNNWithMeans, NormalPredictor, NMF, KNNWithZScore, KNNBasic, SlopeOne. At prediction time, each of these models predicts a response probability given a pair of user ID and item ID. In an online experiment, given a user ID, a trained model predicts the response probabilities of all the items, and the recommendation is generated by taking the top five items and randomly choosing one from them following a uniform distribution. The recommendation is augmented with $\in$-greedy, i.e., the item for recommendation is sampled from a categorical distribution, in which the top five items have $$\frac{(1-\epsilon)}{5}$$

probability and the rest items evenly share $\in$ probability. The experiment set $\in=0.05$.

The users and items are represented by their IDs, which are not good representations for Gaussian process. A Gaussian process binary classifier was augmented by embedding the user and item IDs into two separate latent spaces as mentioned above and use it as the surrogate model. 5D latent spaces were used for the user and item embedding separately and an RBF kernel. The experiment used 1000 inducing points and EI as the acquisition function. When training the surrogate model, the Adam optimizer was used as the gradient optimizer for variational inference, which runs for 200 epochs with the mini-batch size being 100 and the learning rate being 0.001. As the prediction task can also be viewed as matrix imputation, the KNNImputer from the SCIKIT-LEARN package was used as the predictive model for DR-based baselines.

Each model selection experiment includes five sequential online experiments and the model deployed in the first experiments is randomly picked according to a uniform distribution for all the methods. In each online experiment, every user is recommended five times. Twenty experiments were run for each model. In each repeated run, the set of candidate models is the same but the first deployed model and the data points sampled for each online experiment may be different.

Figure 13A:
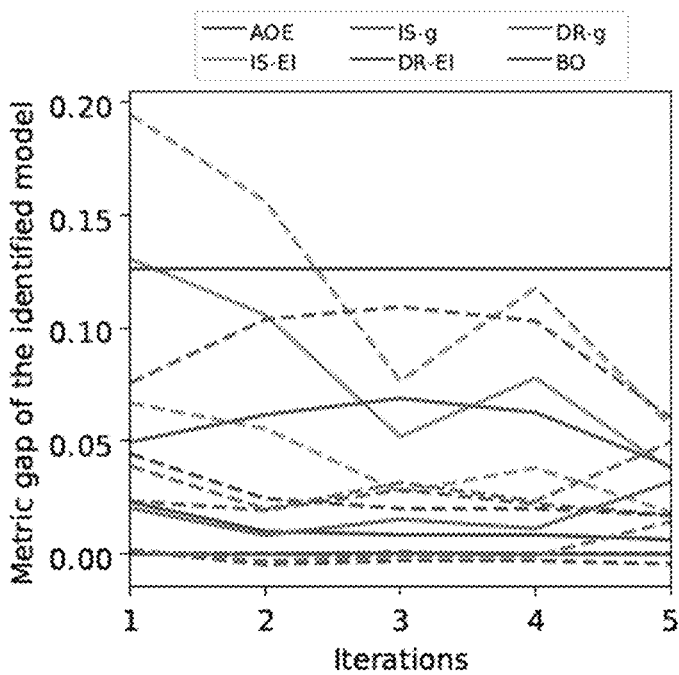
FIG. 13A illustrates a comparison of automated online experimentation and five baseline methods through the twenty sequential online experiments (refer to as iterations), with the y-axis showing the gap in the accumulative metric between the optimal model and the estimated best model by each method.
Figure 13B:
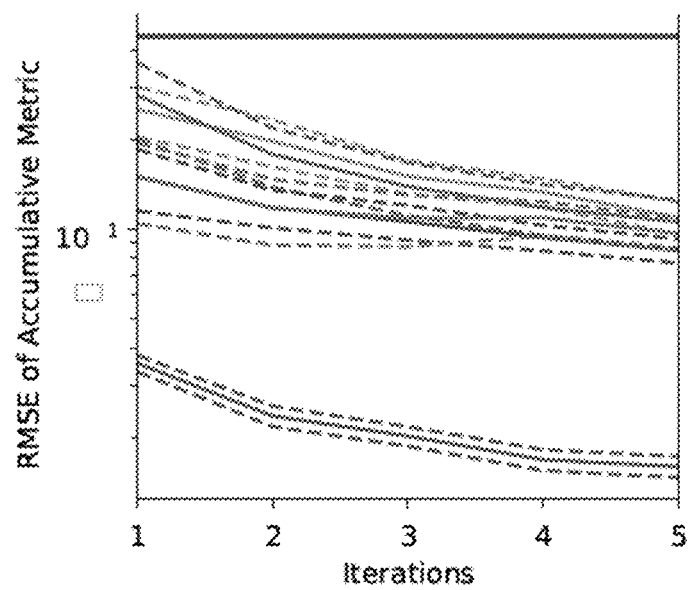
FIG. 13B illustrates the rooted mean square error of the estimated accumulative metrics for all the candidate models from each method.
Figure 14:
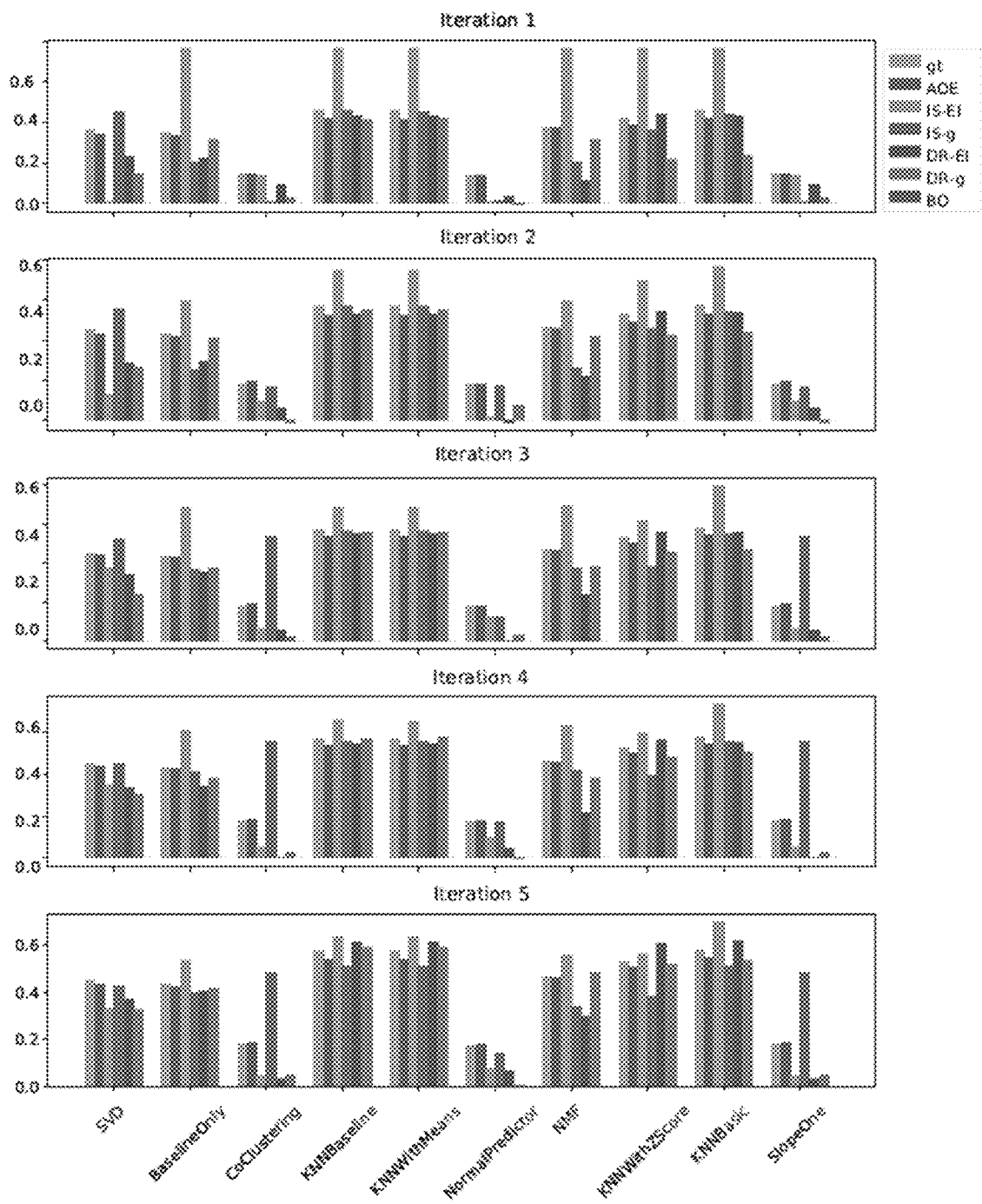
FIG. 14 illustrates bar plots of the estimated accumulative metrics of all the candidate models after each iteration comparing with ground truth (denoted as "gt"). The results come from one of the twenty repeated runs. The y-axis shows the accumulative metric. In the x-axis, each group of bars corresponds to a candidate model (ten in total) and each color of bars corresponds to all the compared methods plus the ground truth.

FIG. 13A shows the comparison of all the methods with error bars in terms of the gap in the accumulative metric between the optimal model and the estimated best model. FIG. 13B shows the average rooted mean square error of the estimated accumulative metrics after each iteration with error bars. The error bars indicate the confidence interval of the estimated mean by two times the standard deviation. The metric gaps and rooted mean square error of all the methods after Iteration 5 are shown in Table 2, below. To illustrate the behaviors of automated online experimentation and the baseline methods during the model selection process, the estimated accumulative metric after each iteration comparing with the ground truth is visualized in FIG. 14. The visualization uses one of the 20 runs.

TABLE 2

| | Metric Gap | Rooted mean square error |
|---|---|---|
| AOE | 0. (0.) | 0.016 (0.0029) |
| IS-EI | 0.038 (0.043) | 0.11 (0.031) |
| IS-g | 0.039 (0.048) | 0.11 (0.043) |
| DR-EI | 0.0063 (0.024) | 0.085 (0.018) |
| DR-g | 0.032 (0.039) | 0.097 (0.027) |
| BO | 0.13 (0.00) | 0.44 (0.00) |

The model selection for production system does not fit into the classical model selection paradigm. Disclosed examples can take data collection into the model selection process and selecting the best model via iterative online experiments. It allows selection from a much larger pool of candidates than using AB testing and gives more accurate selection than off-policy evaluation by actively reducing selection bias. A Gaussian process surrogate model was produced for predicting immediate feedback and derive the distribution of the accumulative metric. The model to deploy at each iteration is picked by balancing the predicted accumulative metric and the uncertainty of the prediction due to limited data. With simulated experiments from real data, the automated online experimentation performs significantly better than all the baselines in terms of identifying the best model and estimating the accumulative metric.

The concept of iterative model deployment also appears in bandit algorithms. A bandit algorithm performs exploration-exploitation for individual user interactions and continuously updates the model. A major difference to our paradigm is that a bandit algorithm is often applied to the decision making scenarios that have tight time constraints because of its short decision time, in which the model is either not updated or updated with incremental learning after each action, while our method selects among different candidate models and each online experiment contains lots of user interactions, which allows us to consider more expensive surrogate models and retrain the surrogate model after each action. Reinforcement learning as a broader framework also considers the problem about evaluating and updating a policy from recorded data with respect to a generic form of reward, which may be delayed and 8 depend on sequential actions. Model selection for production system can be viewed as a special case of reinforcement learning, in which the reward is an average of immediate feedback. This special setting allows us to develop a dedicated surrogate model and make efficient use of data, which is not applicable to the generic reinforcement learning setting. On the other hand, reinforcement learning offers an interesting future direction for handling broader types of accumulative metric beyond the form of average.

Disclosed examples include a new framework of model selection for production system, in which the data collection from automated online experiments is used as part of the model selection procedure. In particular, automated online experimentation was developed as a model selection for production system method that iteratively select models to be deployed online and identify the model with the highest metric of interest from a large pool of candidate models in a few number of online deployments.

Automated online experimentation can be applied to improve the quality of the model selection process for industrial machine learning service development. This type of methods could be implemented either as a part of the in-house development toolset of individual companies or as a component of automated machine learning service on cloud platforms. The adoption of such tooling could increase the development speed of industrial machine learning applications and provide better understanding and control of the release of new features and improvement before large scale deployment. With a more accurate prediction of the online metric of a system improvement, machine learning developers can better identify the impactful system improvements and focus the development effort on them. It also can let the development team and a wider part of a company have a clear picture of the potential impact and limitation of a project before the development has finished.

The automated machine learning model selection, update, deployment tools including automated online experimentation tend to focus on a single metric for mathematical convenience, but the social impact of a machine learning system such as diversity, fairness is hard to summarize into a single metric. The adoption of such tooling without careful consideration can result into overly optimize for the single metric and being blind about broad social impacts, which can potentially lead to undesirable outcomes. Understanding and constraining automated algorithm decisions with respect to its wider impact (e.g., safe reinforcement learning) can mitigate the risk of causing harmful consequences.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
   obtaining media content item analytics data, wherein the media content item analytics data include presentations of media content items to users and lengths of time the users engaged with the media content items that were presented;
   iteratively repeating until an evaluation criterion is satisfied:
   (i) generating a surrogate machine learning model of the media content item analytics data, wherein the surrogate machine learning model describes a distribution of the lengths of time,
   (ii) based on samples from the distribution of the lengths of time, determining scores for a plurality of candidate machine learning models, wherein the plurality of candidate machine learning models each provide presentations of further media content items, and wherein the scores reflect how well the plurality of candidate machine learning models predict further lengths of time of engagement with the media content items that were presented,
   (iii) based on the scores, selecting a highest-scoring machine learning model from the plurality of candidate machine learning models,
   (iv) updating the media content item analytics data with additional media content item analytics data from online use of the highest scoring machine learning model;
   in response to the evaluation criterion being satisfied, deploying a current highest-scoring machine learning model for online use; and
   using the current highest-scoring machine learning model to select particular media content items for online streaming to a particular user.

2. The computer-implemented method of claim 1, wherein the presentations of media content items to users comprises recommending the media content items to the users.

3. The computer-implemented method of claim 1, wherein the media content items include audio content items, and wherein the lengths of time the users engaged with the media content items that were presented include amounts of time the audio content items were played out to the users.

4. The computer-implemented method of claim 3, wherein the audio content items are songs or podcast episodes.

5. The computer-implemented method of claim 1, wherein selecting the highest-scoring machine learning model is also based on an acquisition function that is characterizes an expected improvement over a previous machine learning model.

6. The computer-implemented method of claim 1, wherein selecting the highest-scoring machine learning model is also based on an acquisition function that is characterized a probability of improvement over a previous machine learning model.

7. The computer-implemented method of claim 1, wherein selecting the highest-scoring machine learning model is also based on an acquisition function that is characterized an upper confidence bound of the distribution.

8. The computer-implemented method of claim 1, wherein the evaluation criterion being satisfied comprises at least one of:
   the current highest-scoring machine learning model exhibiting an estimated performance above a first predetermined threshold;
   a predetermined amount of time has elapsed;
   a number of observations in the media content item analytics data is above a second predetermined threshold; or
   a number of users associated with the media content item analytics data is above a third predetermined threshold.

9. A computer-implemented method of claim 1, wherein the current highest-scoring machine learning model, when deployed for online use, provides recommendations of media content items to an application system, and wherein the application system provides the recommendations to user devices.

10. The computer-implemented method of claim 9, wherein media playback engines on the user devices obtain and play out the media content items that were recommended.

11. A non-transitory computer-readable medium storing program instructions that, when executed by one or more processors of a computing system, cause the computing system to perform operations comprising:
    obtaining media content item analytics data, wherein the media content item analytics data include presentations of media content items to users and lengths of time the users engaged with the media content items that were presented;
    iteratively repeating until an evaluation criterion is satisfied:
    (i) generating a surrogate machine learning model of the media content item analytics data, wherein the surrogate machine learning model describes a distribution of the lengths of time,
    (ii) based on samples from the distribution of the lengths of time, determining scores for a plurality of candidate machine learning models, wherein the plurality of candidate machine learning models each provide presentations of further media content items, and wherein the scores reflect how well the plurality of candidate machine learning models predict further lengths of time of engagement with the media content items that were presented,
    (iii) based on the scores, selecting a highest-scoring machine learning model from the plurality of candidate machine learning models,
    (iv) updating the media content item analytics data with additional media content item analytics data from online use of the highest-scoring machine learning model;
    in response to the evaluation criterion being satisfied, deploying a current highest-scoring machine learning model for online use; and
    using the current highest-scoring machine learning model to select particular media content items for online streaming to a particular user.

12. The non-transitory computer-readable medium of claim 11, wherein the presentations of media content items to users comprises recommending the media content items to the users.

13. The non-transitory computer-readable medium of claim 11, wherein the media content items include audio content items, and wherein the lengths of time the users engaged with the media content items that were presented include amounts of time the audio content items were played out to the users.

14. The non-transitory computer-readable medium of claim 13, wherein the audio content items are songs or podcast episodes.

15. The non-transitory computer-readable medium of claim 11, wherein the evaluation criterion being satisfied comprises at least one of:

the current highest-scoring machine learning model exhibiting an estimated performance above a first predetermined threshold;

a predetermined amount of time has elapsed;

a number of observations in the media content item analytics data is above a second predetermined threshold; or a number of users associated with the media content item analytics data is above a third predetermined threshold.

16. A computing system comprising:

one or more processors;

memory; and program instructions, stored in the memory, that upon execution by the one or more processors cause the computing system to perform operations comprising:

obtaining media content item analytics data, wherein the media content item analytics data include presentations of media content items to users and lengths of time the users engaged with the media content items that were presented;

iteratively repeating until an evaluation criterion is satisfied:

(i) generating a surrogate machine learning model of the media content item analytics data, wherein the surrogate machine learning model describes a distribution of the lengths of time, (ii) based on samples from the distribution of the lengths of time, determining scores for a plurality of candidate machine learning models, wherein the plurality of candidate machine learning models each provide presentations of further media content items, and wherein the scores reflect how well the plurality of candidate machine learning models predict further lengths of time of engagement with the media content items that were presented, (iii) based on the scores, selecting a highest-scoring machine learning model from the plurality of candidate machine learning models, (iv) updating the media content item analytics data with additional media content item analytics data from online use of the highest-scoring machine learning model;

in response to the evaluation criterion being satisfied, deploying a current highest-scoring machine learning model for online use; and using the current highest-scoring machine learning model to select particular media content items for online streaming to a particular user.

17. The computing system of claim 16, wherein the presentations of media content items to users comprises recommending the media content items to the users.

18. The computing system of claim 16, wherein the media content items include audio content items, and wherein the lengths of time the users engaged with the media content items that were presented include amounts of time the audio content items were played out to the users.

19. The computing system of claim 18, wherein the audio content items are songs or podcast episodes.

20. The computing system of claim 16, wherein the evaluation criterion being satisfied comprises at least one of:

the current highest-scoring machine learning model exhibiting an estimated performance above a first predetermined threshold;

a predetermined amount of time has elapsed;

a number of observations in the media content item analytics data is above a second predetermined threshold; or a number of users associated with the media content item analytics data is above a third predetermined threshold.

* * * * *

UNITED STATES PATENT AND TRADEMARK OFFICE
CERTIFICATE OF CORRECTION

PATENT NO. : 12,259,950 B2
APPLICATION NO. : 17/063606
DATED : March 25, 2025
INVENTOR(S) : Zhenwen Dai et al.

Page 1 of 1

It is certified that error appears in the above-identified patent and that said Letters Patent is hereby corrected as shown below:

In the Claims

Claim 5, Column 31, Line 63: Please delete the second instance of "is" in this line.

Signed and Sealed this
Third Day of June, 2025

Coke Morgan Stewart
*Acting Director of the United States Patent and Trademark Office*